US012228876B2

(12) United States Patent
Noda

(10) Patent No.: US 12,228,876 B2
(45) Date of Patent: Feb. 18, 2025

(54) IMAGE FORMING APPARATUS

(71) Applicant: Makoto Noda, Tokyo (JP)

(72) Inventor: Makoto Noda, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/205,574

(22) Filed: Jun. 5, 2023

(65) Prior Publication Data

US 2023/0408969 A1 Dec. 21, 2023

(30) Foreign Application Priority Data

Jun. 13, 2022 (JP) ................................ 2022-095100

(51) Int. Cl.
*G03G 21/16* (2006.01)
*G03G 21/20* (2006.01)

(52) U.S. Cl.
CPC ..... *G03G 21/1666* (2013.01); *G03G 21/1647* (2013.01); *G03G 21/206* (2013.01); *G03G 2221/1636* (2013.01)

(58) Field of Classification Search
CPC ....... G03G 2221/1636; G03G 21/1666; G03G 21/206; G03G 21/1647
See application file for complete search history.

(56) References Cited

U.S. PATENT DOCUMENTS

| | | | | | |
|---|---|---|---|---|---|
| 5,208,612 | A * | 5/1993 | Obu | G03G 21/1604 | 399/361 |
| 10,996,619 | B2 * | 5/2021 | Nguyen | G03G 21/1628 | |
| 2002/0028089 | A1 * | 3/2002 | Yoneda | G03G 15/2064 | 399/122 |
| 2002/0106213 | A1 * | 8/2002 | Higeta | G03G 21/1832 | 399/104 |
| 2003/0185584 | A1 * | 10/2003 | Hirose | G03G 21/206 | 399/92 |
| 2005/0047821 | A1 * | 3/2005 | Murayama | G03G 21/1839 | 399/111 |
| 2012/0177407 | A1 * | 7/2012 | Lee | G03G 21/1814 | 399/168 |
| 2012/0201558 | A1 * | 8/2012 | Watanabe | G03G 15/2039 | 399/329 |
| 2013/0258421 | A1 * | 10/2013 | Nakaie | G03G 15/04036 | 358/474 |
| 2014/0356017 | A1 * | 12/2014 | Kobayashi | G03G 21/1666 | 399/98 |

(Continued)

FOREIGN PATENT DOCUMENTS

| | | | | |
|---|---|---|---|---|
| GB | 620113 | A | * | 3/1949 |
| GB | 992841 | A | * | 5/1965 |

(Continued)

*Primary Examiner* — Sevan A Aydin
(74) *Attorney, Agent, or Firm* — XSENSUS LLP

(57) ABSTRACT

An image forming apparatus includes a housing, an exposure device attached to and detachable from the housing, an insertion slot on the housing for the exposure device, a positioning member disposed at a position higher than the insertion slot, the positioning member having an inclined plane, and space that appears under the exposure device when the exposure device is attached to the prescribed position. In the image forming apparatus, the positioning member guides the exposure device to a prescribed position of the exposure device.

17 Claims, 18 Drawing Sheets

(56) References Cited

U.S. PATENT DOCUMENTS

| | | | | |
|---|---|---|---|---|
| 2015/0023693 | A1* | 1/2015 | Kobayashi | G03G 21/1666 399/116 |
| 2015/0346678 | A1* | 12/2015 | Fukuda | G03G 21/1633 399/110 |
| 2016/0154361 | A1* | 6/2016 | Osaki | G03G 21/1695 399/90 |
| 2016/0231562 | A1* | 8/2016 | Suga | G03G 15/04072 |
| 2016/0352955 | A1 | 12/2016 | Ishida et al. | |
| 2019/0283991 | A1 | 9/2019 | Noda | |
| 2020/0073325 | A1* | 3/2020 | Zeng | G03G 21/186 |
| 2020/0272087 | A1* | 8/2020 | Sueshige | G03G 21/1671 |
| 2021/0173322 | A1* | 6/2021 | Matsuo | G02B 3/06 |

FOREIGN PATENT DOCUMENTS

| | | | | |
|---|---|---|---|---|
| JP | H0533059 | U * | 4/1993 | |
| JP | 3432096 | B2 * | 7/2003 | B41J 2/471 |
| JP | 2004-361826 | | 12/2004 | |
| JP | 2011-123396 | | 6/2011 | |
| JP | 2015-175886 | | 10/2015 | |

* cited by examiner

IMAGE FORMING APPARATUS

CROSS-REFERENCE TO RELATED APPLICATION

This patent application is based on and claims priority pursuant to 35 U.S.C. § 119(a) to Japanese Patent Application No. 2022-095100, filed on Jun. 13, 2022, in the Japan Patent Office, the entire disclosure of which is hereby incorporated by reference herein.

BACKGROUND

Technical Field

Embodiments of the present disclosure relate to an image forming apparatus.

Background Art

In electronic devices provided with an image forming apparatus, heat is liberated as the power is consumed. If the ambient temperature exceeds a predetermined temperature due to the liberated heat, the originally-intended function of the electronic device is disabled. In order to handle such a situation, as known in the art, cooling should be performed such that the ambient temperature does not exceed a predetermined temperature.

Currently, there is an increasing demand for an increase in the number of images formed per unit time in image forming apparatuses. In order to satisfy such a demand, the polygon motor that is used for the polygon mirror provided for an exposure device has to be rotated at high speed. Accordingly, the power consumption increases and the temperature rises. If the temperature rises, the risen temperature may exceed the temperature specified in the standard of the polygon motor, and an optical element such as a lens used for an optical writing device of the exposure device may expand. As a result, for example, the image quality may deteriorate. The polygon motor needs to be cooled in order to maintain the image quality while increasing the number of sheets subjected to image formation per unit time.

The above-described optical writing device needs to be a component in service, and the optical writing device needs to be replaceable in case of failures. For this reason, the exposure device that is arranged inside needs to be accessible from the outside of the image forming apparatus such that the exposure device is attachable to and detachable from the housing of the image forming apparatus.

In the image forming apparatuses known in the art, one large integrated circuit board such as a power-supply unit (PSU) serves as a power source for a plurality of modules arranged in the image forming apparatus. The mechanical position of the components is prioritized in the arrangement inside the image forming apparatus. In view of the above circumstances, typically, a circuit board is arranged near the outer wall of the image forming apparatus so as to avoid the interference with the components.

Typically, the supporting portion for the rotating mirror shaft is arranged below the mirror in the polygon motor arranged inside the exposure device, and such a supporting portion is integrated into the circuit board. Such a polygon motor is fixed to the bottom of the exposure device by, for example, screws, and the highest-temperature point is around the bottom of the exposure device.

Some technologies given below are known in the art on the precondition that the polygon motor can be cooled, the exposure device is attachable to and detachable from the housing of the image forming apparatus, and that a large component or element such as a circuit board is arranged near the outside of the housing of the image forming apparatus.

Firstly, some techniques have been proposed that cooling can be performed efficiently and a writing unit can be supported without increasing the size of the apparatus even if the writing device is upsized. In such technologies known in the art, gap or space that form a ventilation airway for cooling air is arranged on both sides of the member below the bottom face of the writing device. The cooling air cools the writing device and the inside of the apparatus. Secondly, some technologies have been proposed to prevent the deterioration of image quality by cooling the writing device efficiently using a cooler that can efficiently cool the writing device with a relatively simple configuration. In such technologies known in the art, the pair of exterior walls of the housing of the writing device are directly cooled by the outside-air flow blown into the airway of the duct by a pair of air-intake fans.

Finally, some technologies have been proposed to prevent a light-emitting diode (LED) head from contacting a member that makes up a processing unit with reliability when the processing unit is attached to or detached from the housing of the image forming apparatus, with a relatively compact and simple configuration or structure. In such technologies known in the art, the first supporting structure that supports an image bearer is supported by the second supporting structure that supports the LED head, and a restricting unit is arranged that restricts the removal of the first supporting structure when the second supporting structure is at a position where exposure is to be performed.

SUMMARY

Embodiments of the present disclosure described herein provide an image forming apparatus including a housing, an exposure device attached to and detachable from the housing, an insertion slot on the housing for the exposure device, a positioning member disposed at a position higher than the insertion slat, the positioning member having an inclined plane, and space that appears under the exposure device when the exposure device is attached to the prescribed position. In the image forming apparatus, the positioning member guides the exposure device to a prescribed position of the exposure device.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
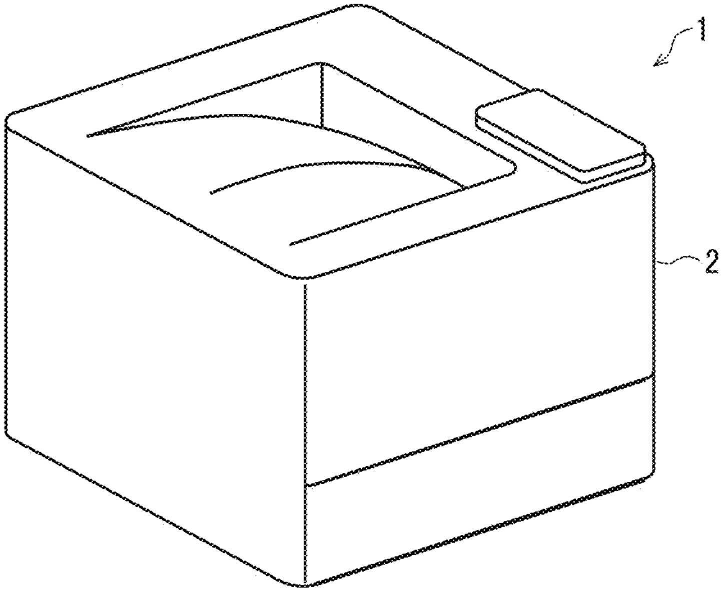
FIG. 1 is a schematic perspective view of an image forming apparatus according to the first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present disclosure are described below in detail with reference to the drawings. In embodiments of the present disclosure, the space that is sufficiently large for cooling an image forming apparatus is arranged around an exposure device without increasing the size of the housing of the image forming apparatus. In short, the position at which the exposure device is externally inserted into the image forming apparatus and a prescribed position inside the image forming apparatus to which the exposure device is attached are different from each other in the height direction. In other words, when the exposure device 6 is inserted into the housing 2 in the horizontal direction through the insertion slat arranged at an outer portion of the housing in relation to the attachment and detachment of the exposure device from the housing of the image forming apparatus, the exposure device shifts not only in the horizontal direction but also in the upper portion by a positioning member that is arranged inside the housing and has an inclined plane thereon. Finally, the exposure device is aligned at a position higher than the insertion slot. Some embodiments of the present disclosure are described below with reference to the drawings.

FIG. 1 is a schematic perspective view of an image forming apparatus according to the first embodiment of the present disclosure.

Figure 2:
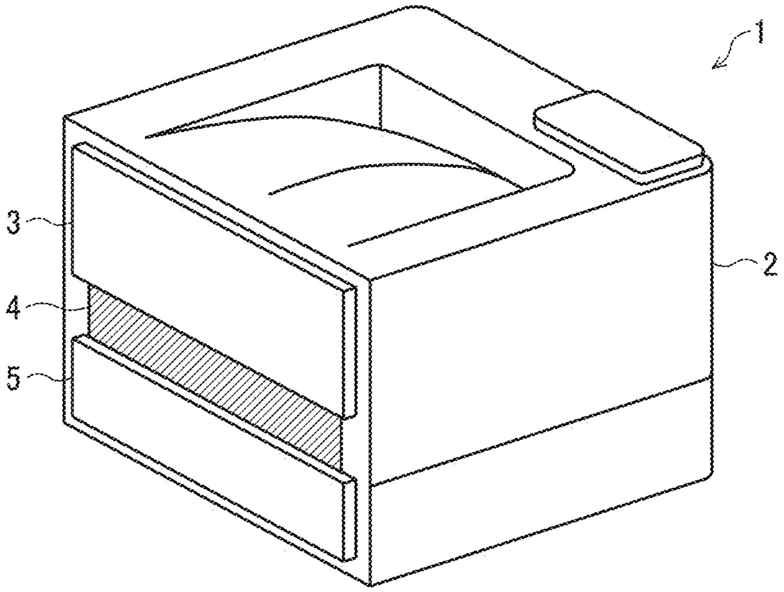
FIG. 2 is a schematic perspective view of an image forming apparatus, where some exterior components and an exposure device are detached from its housing, according to an embodiment of the present disclosure.

FIG. 2 is a schematic perspective view of the image forming apparatus, where some exterior components and an exposure device 6 are detached from its housing 2, according to the present embodiment.

Figure 3:
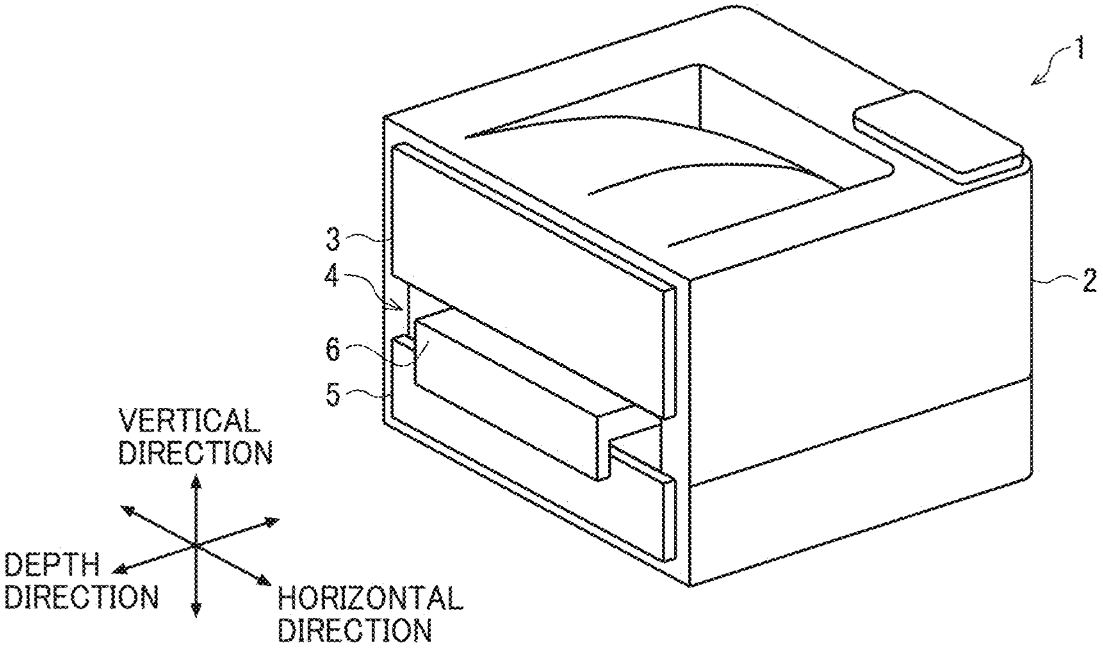
FIG. 3 is a schematic perspective view of an image forming apparatus, where an exposure device is attached to the housing as illustrated in FIG. 2, according to an embodiment of the present disclosure.

FIG. 3 is a schematic perspective view of the image forming apparatus, where the exposure device 6 is attached to the housing 2 as illustrated in FIG. 2, according to the present embodiment.

Figure 4:
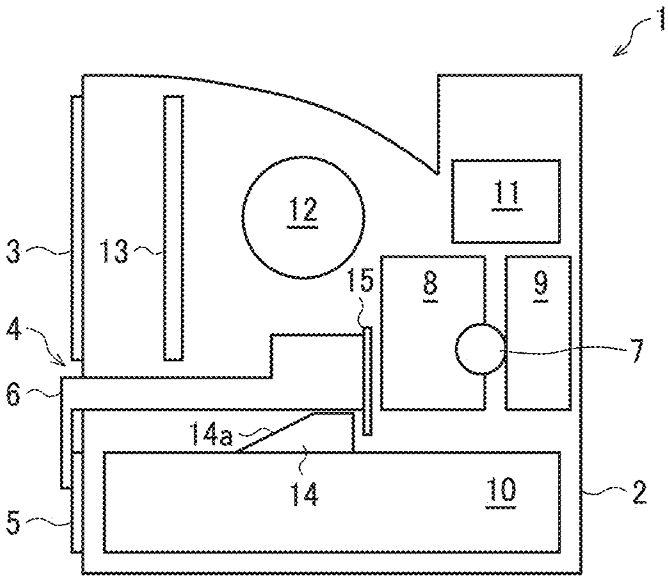
FIG. 4 is a schematic diagram illustrating the internal structure of an image forming apparatus according to an embodiment of the present disclosure.

FIG. 4 is a schematic diagram illustrating the internal structure of the image forming apparatus according to the present embodiment.

As illustrated in FIG. 1, FIG. 2, and FIG. 3, a power supply board cover 3, an insertion slot 4, and a first housing bracket 5 are arranged on one side of a housing 2 of a printer 1, which serves as the image forming apparatus, inside the exterior board. As illustrated in FIG. 3 and FIG. 4, the exposure device 6 is attached to the insertion slat 4.

As illustrated in FIG. 3, in the description of the present embodiment given below the direction in which the exposure device 6 is attached or detached is defined as a depth direction, and the height direction of the image forming apparatus is defined as a vertical direction. Moreover, the longitudinal or longer-side direction of an image bearer 7 is defined as a horizontal direction.

As illustrated in FIG. 4, for example, an image bearer 7, an image forming device 8, a transfer device 9, a feed tray 10, a fixing device 11, and a replenishment device 12 are arranged inside the housing 2 in addition to the exposure device 6 as described above. Moreover, a large component such as a power supply board 13 and a positioning member 14 that determines the relative positions of the exposure device 6 are arranged inside the housing 2. When the exposure device 6 is attached and positioned at the prescribed position as illustrated in FIG. 4, the insertion slot 4 is closed by the exposure device 6, and the outer surface of the exposure device 6 is substantially flush with the outer surface of the housing 2.

Secondly, processes in the present embodiment in which the exposure device 6 is inserted into the housing 2 and is aligned and positioned at a prescribed position are described.

Figure 5:
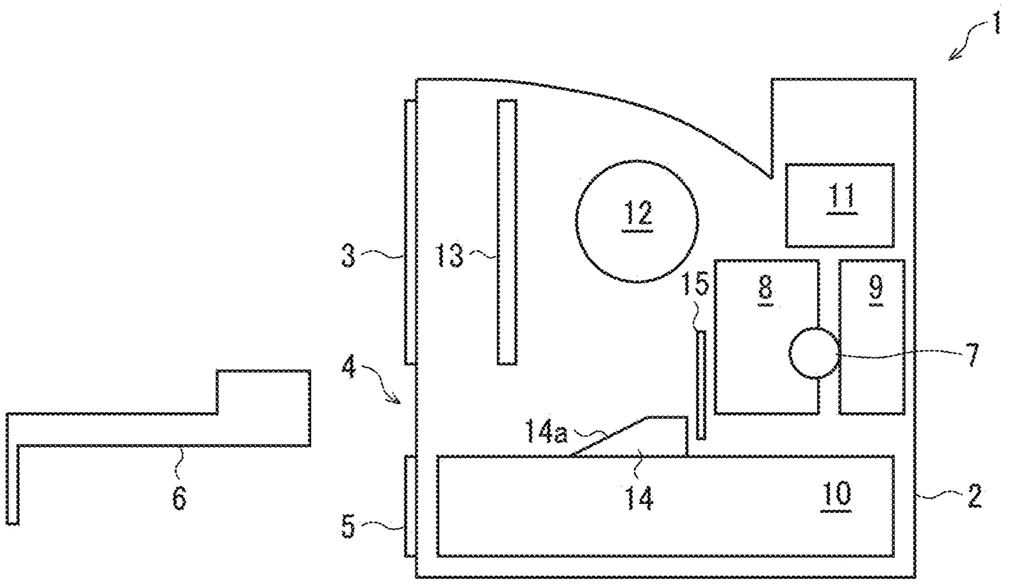
FIG. 5 is a schematic diagram illustrating an image forming apparatus before an exposure device is attached to a housing, according to an embodiment of the present disclosure.

FIG. 5 is a schematic diagram illustrating the printer 1 before the exposure device 6 is attached to the housing 2, according to the present embodiment.

Figure 6:
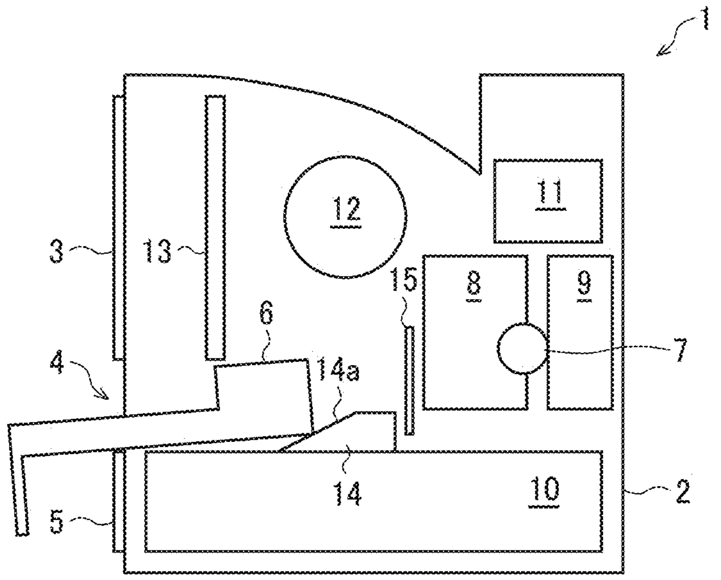
FIG. 6 is a schematic diagram illustrating the image forming apparatus, where an exposure device is being attached to the housing of the image forming apparatus, according to an embodiment of the present disclosure.

FIG. 6 is a schematic diagram illustrating the image forming apparatus, where the exposure device 6 is being attached to the housing 2, according to the present embodiment.

The exposure device 6 is gripped by an operator as illustrated in FIG. 5 and then is inserted into the insertion slot 4 as illustrated in FIG. 6. As illustrated in FIG. 6, the bottom end of the exposure device 6 in the insertion direction contacts an inclined plane 14*a* of the positioning member 14 fixed to the inside of the housing 2. Due to such a configuration, as the exposure device 6 is moved in the depth direction illustrated in FIG. 3 and moved from the left to the right in FIG. 5, the exposure device 6 according to the present embodiment moves upward inside the housing 2 along the angle of the inclined plane Na while moving in the depth direction.

Figure 7:
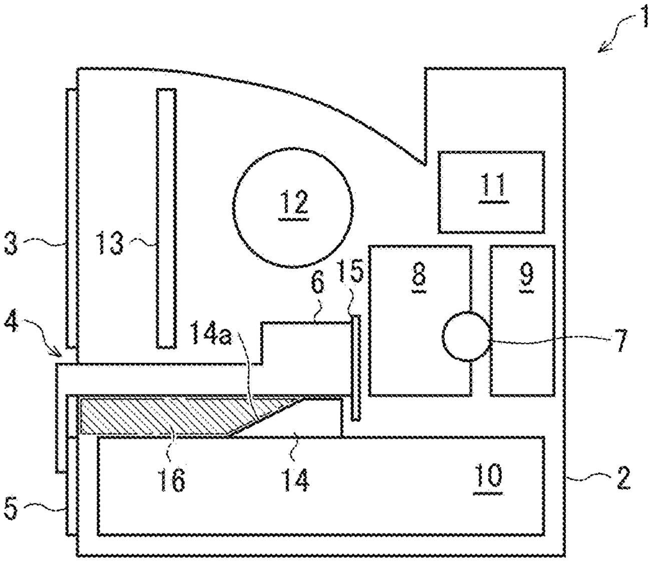
FIG. 7 is a schematic diagram illustrating an image forming apparatus, where an exposure device is attached and positioned at a prescribed position of the housing of the image forming apparatus, according to an embodiment of the present disclosure.

When the exposure device 6 is further moved in the depth direction with reference to the state illustrated in FIG. 6, the exposure device 6 is placed on the upper surface of the positioning member 14, and is aligned by the second housing bracket 15 arranged downstream from the first housing bracket 5 and the positioning member 14 in the depth direction. As a result, the printer 1 reaches a state as illustrated in FIG. 7. The attachment and positioning of the exposure device 6 at a prescribed position will be described later in detail.

FIG. 7 is a schematic diagram illustrating the image forming apparatus, where the exposure device 6 is attached and positioned at a prescribed position of the housing 2, according to the present embodiment.

In this configuration, space 16 is formed below the exposure device 6, as indicated by hatching in FIG. 7, inside the housing 2. The position of the exposure device 6 as illustrated in FIG. 7 is the prescribed position to which the exposure device 6 is attached. The prescribed position according to the present embodiment is higher than the position where the exposure device 6 is inserted into the housing 2 through the insertion slot 4 as illustrated in FIG. 5. In other words, the prescribed position according to the present embodiment is arranged above in the vertical direction.

As described above, the exposure device 6 can be moved upward in the vertical direction by the positioning member 14 having the inclined plane 14*a* while moving the exposure device 6 in the horizontal direction, and the space can be arranged below the exposure device 6. Due to such a configuration, the space 16 that is sufficiently large for cooling is arranged around the exposure device 6 and the printer 1 that can effectively cool the exposure device 6 can be provided without increasing the size of the housing 2.

A configuration or structure of the image forming apparatus to which the exposure device 6 according to the embodiments of the present disclosure can be applied is described below.

Figure 8:
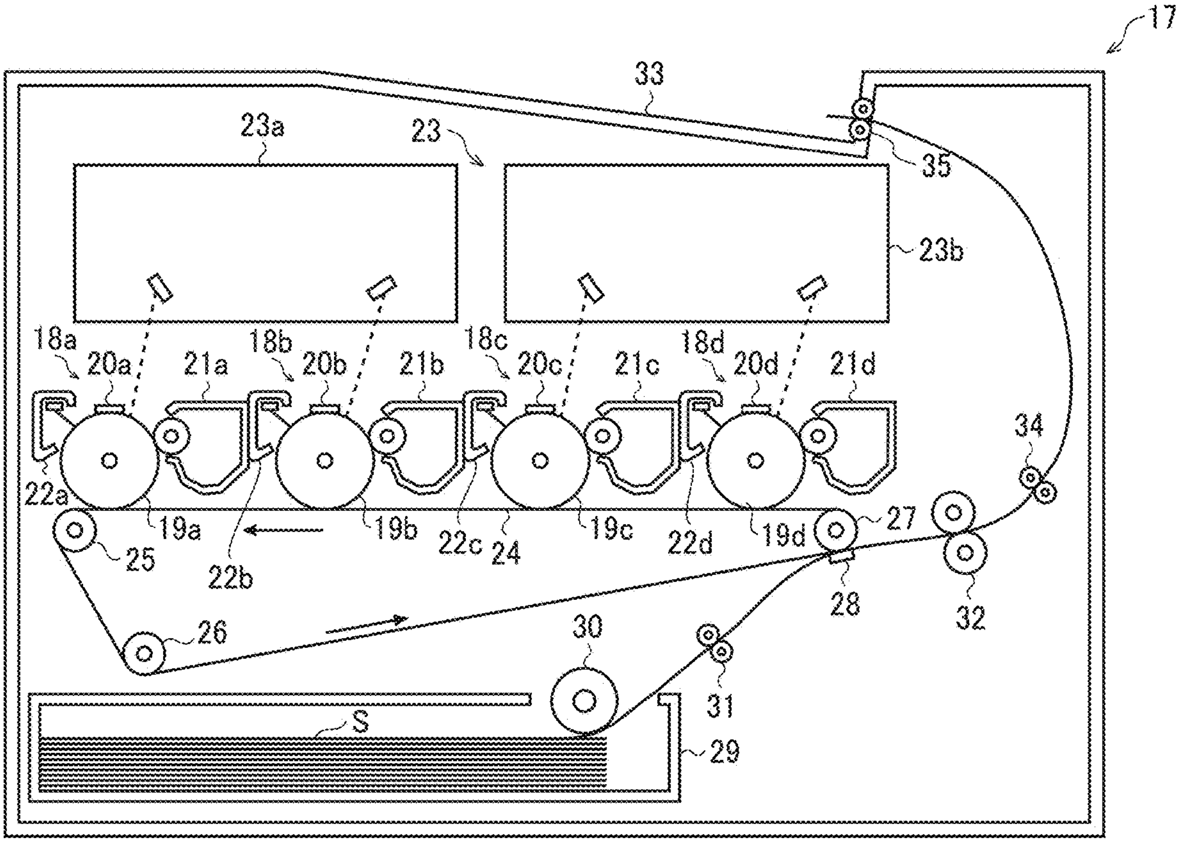
FIG. 8 is a schematic front view of an image forming apparatus to which embodiments of the present disclosure can be applied.

FIG. 8 is a schematic front view of a full-color printer 17 that serves as an image forming apparatus, according to the present embodiment.

The full-color printer 17 according to the present embodiment is provided with an electrophotographic image forming device, and such an electrophotographic image forming device is provided with four image forming devices 18*a*, 18*b*, 18*c*, and 18*d*. The multiple image forming devices 18*a*, 18*b*, 18*c*, and 18*d* have substantially the same configuration or structure except for the color of the toner contained in each one of the image forming devices, and a black (K) toner image, a magenta (M) toner image, a cyan (C) toner image, and a yellow (Y) toner image are formed on multiple image forming devices 18*a*, 18*b*, 18*c*, and 18*d*, respectively. As the multiple image forming devices 18*a*, 18*b*, 18*c*, and 18*d* have substantially the same configuration or structure except for the color of the toner, indexes such as a, b, c, and d may be omitted where appropriate in the following description.

Each one of the multiple image forming devices 18 is provided with a photoconductor 19 that is shaped like a drum and serves an image bearer, and a current-carrying part 20, a developing device 21, and a cleaning device 22 are arranged around the photoconductor 19. As illustrated in FIG. 8, the multiple photoconductors 19 are driven to rotate in a clockwise direction, and a predetermined bias voltage is applied to the current-carrying part 20. As a result, the surfaces of the multiple photoconductors 19 are evenly charged. The current-carrying part 20 according to the present embodiment may use any one of a non-contact method that makes use of, for example, corona discharge and a contact method using, for example, a roller that contacts the photoconductor 19.

An exposure device 23 that serves as an optical scanning device is arranged above the multiple image forming devices 18. The exposure device 23 according to the present embodiment includes a first exposure device 23*a* that serve as a magenta (M) unit and yellow (Y) unit and exposes and scans a pair of photoconductors 19*a* and 19*b*, and a second exposure device 23*b* that serve as a black (BK) unit and a cyan (C) unit and exposes and scans a pair of photoconductors 19*c* and 19*d*. The exposure device 23 according to the present embodiment controls the turning on and off of lighting based on the image data to irradiate the surfaces of corresponding ones of the multiple photoconductors 19 with scanned light. As a result, an electrostatic latent image is formed. The electrostatic latent image that is formed on the multiple photoconductors 19 using the exposure device 23 is visualized by the multicolor toner when passes through the developing device 21 as the multiple photoconductors 19 rotate on the axis.

An intermediate transfer belt 24 that is an endless belt and serves as an intermediate transferor is arranged so as to face the multiple photoconductors 19, and the surface of the intermediate transfer belt 24 contacts the surfaces of the multiple photoconductors 19.

The intermediate transfer belt 24 is looped over the multiple support rollers 25, 26, 27, and the support roller 27 is driven to rotate by a drive motor that serves as a driving source. Once the support roller 27 is driven to rotate, the intermediate transfer belt 24 is driven to run in a counter-clockwise direction indicated by the arrows as illustrated in FIG. 8, and the support rollers 25 and 26 are driven to rotate on the axis as the intermediate transfer belt 24 is driven to move.

On the other side of the intermediate transfer belt 24, four primary transfer rollers are disposed so as to face the respective photoconductors 19 having the intermediate transfer belt 24 therebetween. First primary transfer bias is applied to the each one of the primary transfer rollers from a high-voltage power source, and the toner images on the multiple photoconductors 19, which are rendered visible by the multiple developing devices 21, are superimposed on top of one another and transferred onto the intermediate transfer belt 24. The transfer residual toner that remains on some of the multiple photoconductors 19 without being primarily transferred is removed by the cleaning blade provided for the cleaning device 22 in order to get prepared for the next image-forming operation by the multiple photoconductors 19.

A secondary transfer charger 28 that serves as a secondary transfer unit is arranged at a predetermined distance from the intermediate transfer belt 24 so as to face the support roller 27 having the intermediate transfer belt 24 therebetween. A voltage of reversed polarity to that of the current-carrying part 20 is applied to the secondary transfer charger 28.

The full-color printer 17 according to the present embodiment is provided with, for example, a sheet tray 29 on which a plurality of sheets S serving as recording media to be used for image formation are stacked, a sheet feeding roller 30 that feeds the sheet S stored in the sheet tray 29 on a one-by-one basis, and a registration roller pair 31 that feeds the fed sheet S to a secondary transfer charger 28 at a prescribed timing.

A fixing device 32 that is composed of a pair of rollers including a heating roller and a pressure roller and applies heat and pressure to the sheet S to fix the secondarily transferred not-yet fixed toner image on the sheet S are arranged downstream from the secondary transfer charger 28 in the conveyance direction of the sheet S. A conveyance roller pair 34 and an output roller pair 35 that eject the sheet S that has passed through the fixing device 32 to a sheet ejection unit such as an output tray 33 are arranged downstream from the fixing device 32 in the conveyance direction of the sheet S.

The image-forming operation of the full-color printer 17 is described below. Also in the image-forming operation of the full-color printer 17, a toner image is formed on each one of the multiple photoconductors 19 and the toner image is primarily transferred onto the intermediate transfer belt 24 in a similar manner to each other among the multiple image forming devices 18 except that the colors of the toner images are different from each other. For this reason, indexes such as a, b, c, and d may be omitted where appropriate in the following description.

Once an image-forming signal is received from an external device such as a personal computer (PC), the multiple photoconductors 19 are driven to start rotating in a clockwise direction as illustrated in FIG. 8. At that time, an electric-charge removing device starts operating and the surface potential of each one of the multiple photoconductors 19 is initialized. Each one of the multiple photoconductors 19 whose surface potential has been initialized is evenly charged to a prescribed polarity by a current-carrying part 20. Subsequently, the charged surfaces of the multiple photoconductors 19 are irradiated with the laser beams emitted from the exposure device 23, and a desired electrostatic latent image is formed on the surface of the photoconductor 19. The image data to be formed as the multiple photoconductors 19 are exposed and scanned by the exposure device 23 includes a plurality of items of single-color image data obtained by separating desired full-color image into multiple items of color data of yellow (Y) toner, cyan (C) toner, magenta (M) toner, and black (BK) toner. As described above, the electrostatic latent images that are formed on the multiple photoconductors 19 are visualized as supplied with multicolor toner when passes through the developing device 21, and are visualized as toner images.

The intermediate transfer belt 24 according to the present embodiment is driven in a counterclockwise direction in FIG. 8, and a plurality of primary transfer rollers that contact the intermediate transfer belt 24 are also driven to rotate as the intermediate transfer belt 24 is driven to move.

A primary transfer voltage having a reversed polarity to the polarity of the charged toner of the toner images formed on the multiple photoconductors 19 is applied to the multiple primary transfer rollers, and a primary transfer electric field is formed between the multiple photoconductors 19 and the intermediate transfer belt 24 due to the effect of the primary transfer voltage. The toner image on the photoconductor 19 is electrostatically and primarily transferred onto the intermediate transfer belt 24 that runs in synchronization with the photoconductor 19. The multicolor toner images that are primarily transferred as described above are successively superimposed on top of one another and transferred onto the intermediate transfer belt 24 at prescribed timings from an upstream side to a downstream side of the path in the direction of travel of the intermediate transfer belt 24. As a result, a full-color toner image is formed on the intermediate transfer belt 24 as desired.

On the other hand, a sheet S that serves as a recording medium is separately fed from the top of a bundle stacked in the sheet tray 29 on a one-piece-by-one-piece basis by the operation of, for example, the sheet feeding roller 30, and is conveyed to the nip of the registration roller pair 31. The front end of the conveyed sheet S contacts the nip of the registration roller pair 31, and form a so-called loop. By so doing, the registration of the sheet S is performed.

Subsequently, the registration roller pair 31 is driven to rotate in a synchronized manner with the full-color toner image formed on the intermediate transfer belt 24, and the sheet S is fed toward the secondary transfer unit that is composed of the support roller 27 and the secondary transfer charger 28. A predetermined transfer voltage is applied to the secondary transfer charger 28, and the full-color toner image that is borne on the intermediate transfer belt 24 is transferred onto the sheet S all at once.

The sheet S onto which a full-color toner image has been transferred is conveyed to the fixing device 32, and heat and pressure are applied to the sheet S when the sheet S passes through the fixing device 32. As a result, the full-color toner image is fixed on the sheet S as a semipermanent full-color image. The sheet S onto which an image has been fixed is ejected to the output tray 33 through the conveyance roller pair 34 and the output roller pair 35.

The residual toner that was not transferred by the secondary transfer unit provided with the secondary transfer charger 28 and left on the intermediate transfer belt 24 is removed or recycled by the intermediate transfer belt cleaner that is arranged near the support roller 25 or the support roller 26.

A configuration or structure of the exposure device 23 is described below. The exposure device 23 according to the present embodiment includes a first exposure device 23*a* that serve as a magenta (M) unit and yellow (Y) unit and exposes and scans a pair of photoconductors 19*a* and 19*b*, and a second exposure device 23*b* that serve as a black (BK) unit and a cyan (C) unit and exposes and scans a pair of photoconductors 19*c* and 19*d*. As the first exposure device 23*a* and the second exposure device 23*b* have the same layout in their optical axes, the second exposure device 23*b* according to the present embodiment is described and the description of the first exposure device 23*a* is omitted where appropriate.

Figure 9:
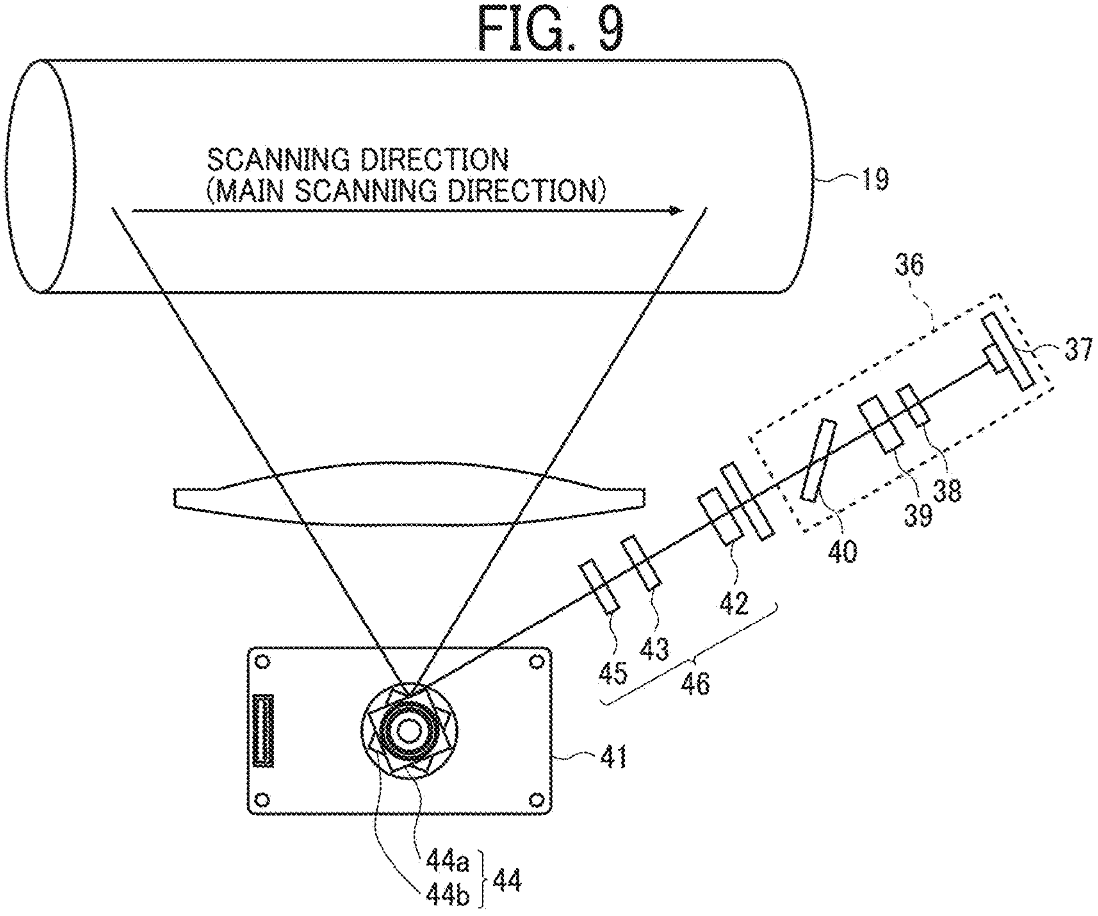
FIG. 9 is a schematic diagram of an incident optical system of a second exposure device to which embodiments of the present disclosure can be applied.

FIG. 9 is a schematic diagram of an incident optical system 46 provided for the second exposure device 23*b*, according to the present embodiment.

As illustrated in FIG. 9, the light source unit 36 that emits laser beams includes, for example, a light source 37 that emits laser beams by linear polarization, a quarter-wave plate 38 that converts the laser beam into circularly-polarized laser beam, a collimator lens 39 that converts the laser beam that has been deflected and transformed by the quarter-wave plate 38 into parallel light, and an aperture plate 40 that cuts out the collimated laser beam. The light source 37 according to the present embodiment is, for example, a laser diode (LD), a laser-diode array (LDA), and a vertical-cavity surface-emitting laser (VCSEL), and has a plurality of light-emitting points. These optical elements are integrally assembled and held in a light-source holder, and the laser beam that is emitted from the light source unit 36 passes through the incident optical system 46, and is incident on a deflector 41 that serves as a light deflector The incident optical system 46 that forms the beam profile includes a prism beam splitter or polarizing beam splitter (PBS) 42 that splits the laser beam emitted from the light source unit 36 into two laser beams on the section in the sub-scanning direction, and a quarter-wave plate 43 that converts the linearly-polarized laser beams, which are previously split into two different directions, into circularly-polarized laser beams. Moreover, the incident optical system 46 is provided with a cylindrical lens (CYL) 45 that forms an image of the circularly-polarized laser beams on the mirror surface of the polygon mirror 44. The cylindrical lens (CAT) 45 is provided for the deflector 41, and has power only in the sub-scanning section.

An image of the laser beams that are formed by the incident optical system 46 is formed on the mirror surfaces of the polygon mirror 44 that is stably driven by the deflector 41 at a desired number of revolutions per minute (rpm). As the laser beams are incident on the mirror surfaces of the polygon mirror 44 as described above, the laser beams are scanned in the main scanning direction.

Figure 10:
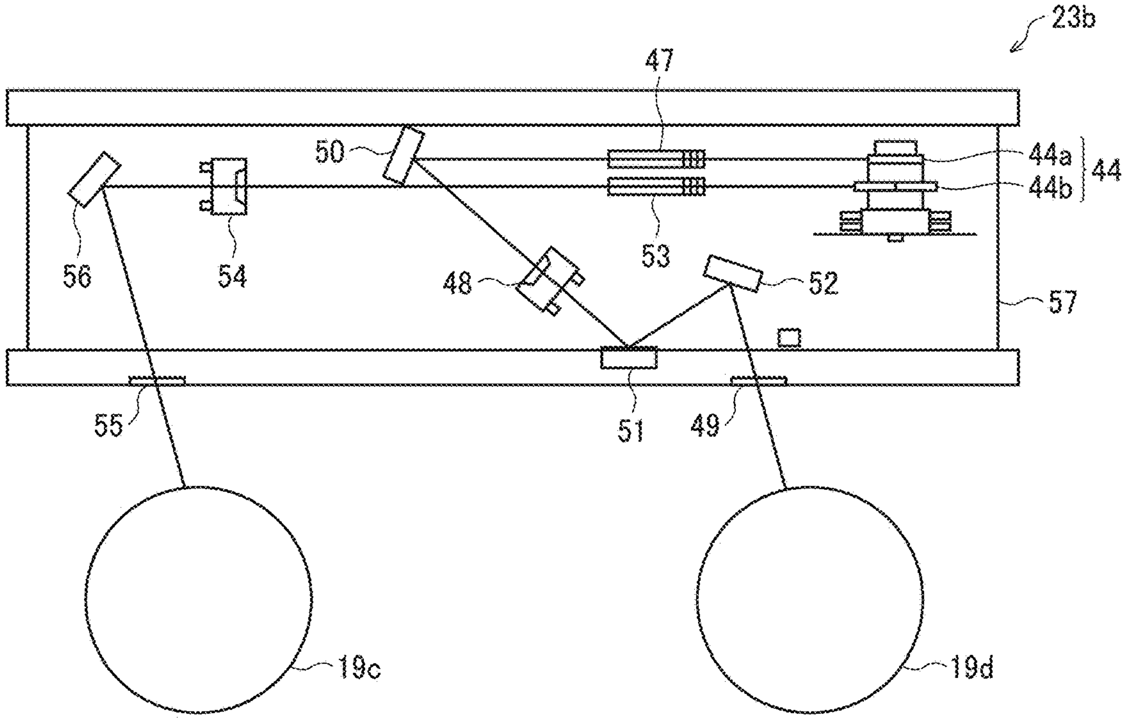
FIG. 10 is a schematic diagram illustrating a configuration of the scanning optical system to which embodiments of the present disclosure can be applied.

FIG. 10 is a schematic diagram illustrating a configuration of the scanning optical system according to the present embodiment.

As illustrated in FIG. 9 and FIG. 10, the polygon mirror 44 according to the present embodiment is provided with an upper mirror 44*a* and a lower mirror 44*b*.

The laser beam that is scanned by the upper mirror 44*a* passes through a first exit lens 47, a second exit lens 48, and a dustproofing glass 49 each of which serves as an optical lens, and is equal-speed scanned by the surface of the photoconductor 19*d* to form an electrostatic latent image. Moreover, a plurality of mirrors 50, 51, and 52 that turn the laser beams are arranged on the optical path of the laser beams emitted from the upper mirror 44*a*.

By contrast, the laser beam that is scanned by the lower mirror 44*b* passes through a first exit lens 53, a second exit lens 54, and a dustproofing glass 55, and is equal-speed scanned by the surface of the photoconductor 19*c* to form an electrostatic latent image. Moreover, a mirror 56 that turns the laser beams are arranged on the optical path of the laser beams emitted from the lower mirror 44*b*.

Those elements of the scanning optical system such as the incident optical system 46 and the deflector 41 are integrally fixed to the housing 57 of the second exposure device 23*b* to achieve the properties and characteristics of the exposure device 23.

Figure 11:
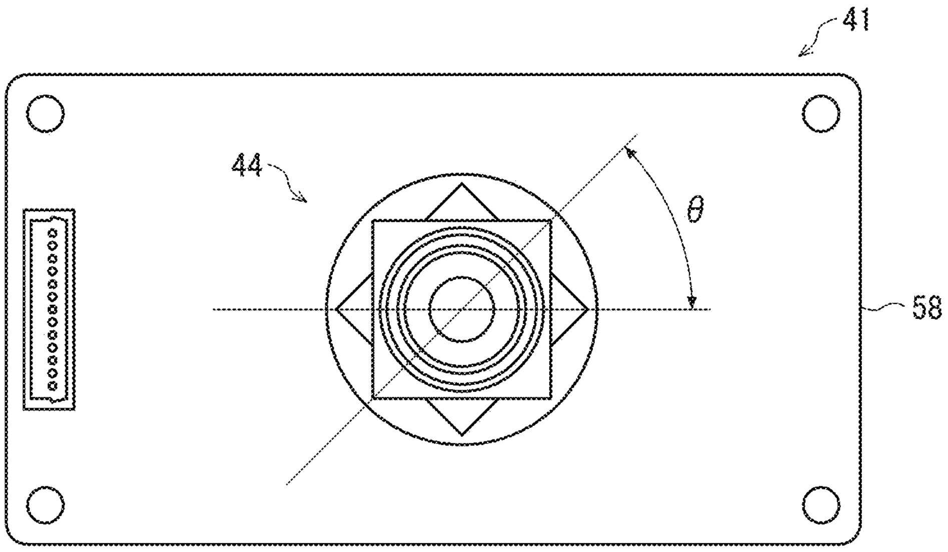
FIG. 11 is a schematic diagram illustrating a configuration of a deflector used in embodiments of the present disclosure.

FIG. 11 is a schematic diagram illustrating a configuration of the deflector 41 used in embodiments of the present disclosure.

As illustrated in FIG. 11, the deflector 41 according to the present embodiment has a polygon mirror 44 on a motor circuit board 58. The polygon mirror 44 has one stage or two stages of polarizing mirrors having a plurality of mirror surfaces, and the polygon mirror 44 according to the present embodiment has an upper mirror 44*a* and a lower mirror 44*b* at two stages. The upper mirror 44*a* and the lower mirror 44*b* according to the present embodiment are stacked so as to be shifted from each other by an angle θ in the rotation direction. In the polygon mirror 44 according to the present embodiment, θ is 45 degrees. However, no limitation is intended thereby, and the value of θ is not limited to 45 degrees. As illustrated in FIG. 10, the upper mirror 44*a* scans the photoconductor 19*d*, and the lower mirror 44*b* scans the photoconductor 19*c*. However, those elements of the polygon mirror 44, i.e., the upper mirror 44*a* and the lower mirror 44*b*, do not perform scanning at the same time geometrically, and can perform exposing and scanning based on the image data corresponding to each one of the multiple image forming devices 18.

Figure 12:
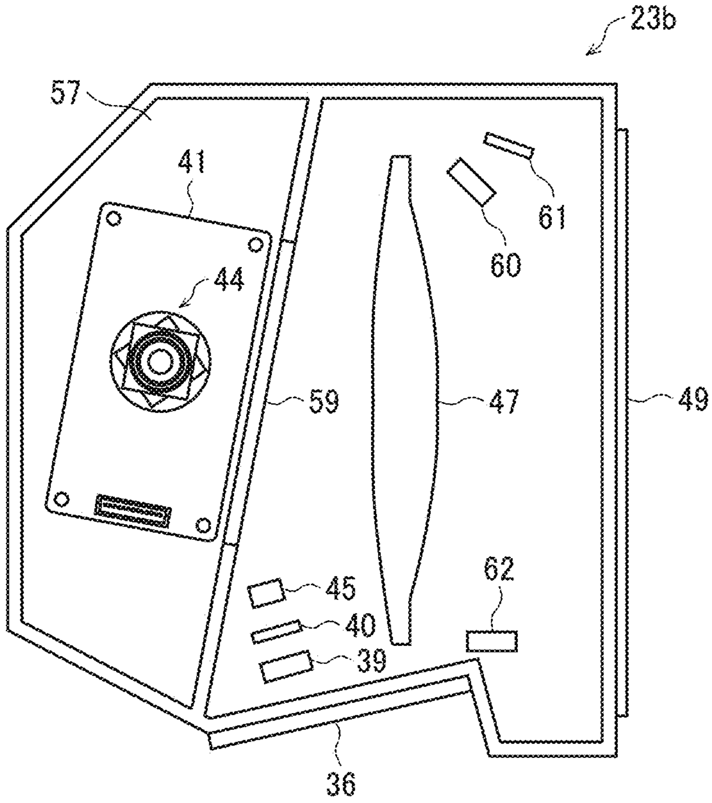
FIG. 12 is a schematic diagram illustrating a configuration of an exposure device used in embodiments of the present disclosure.

FIG. 12 is a schematic diagram illustrating a configuration of the exposure device 23 used in embodiments of the present disclosure.

Figure 16:
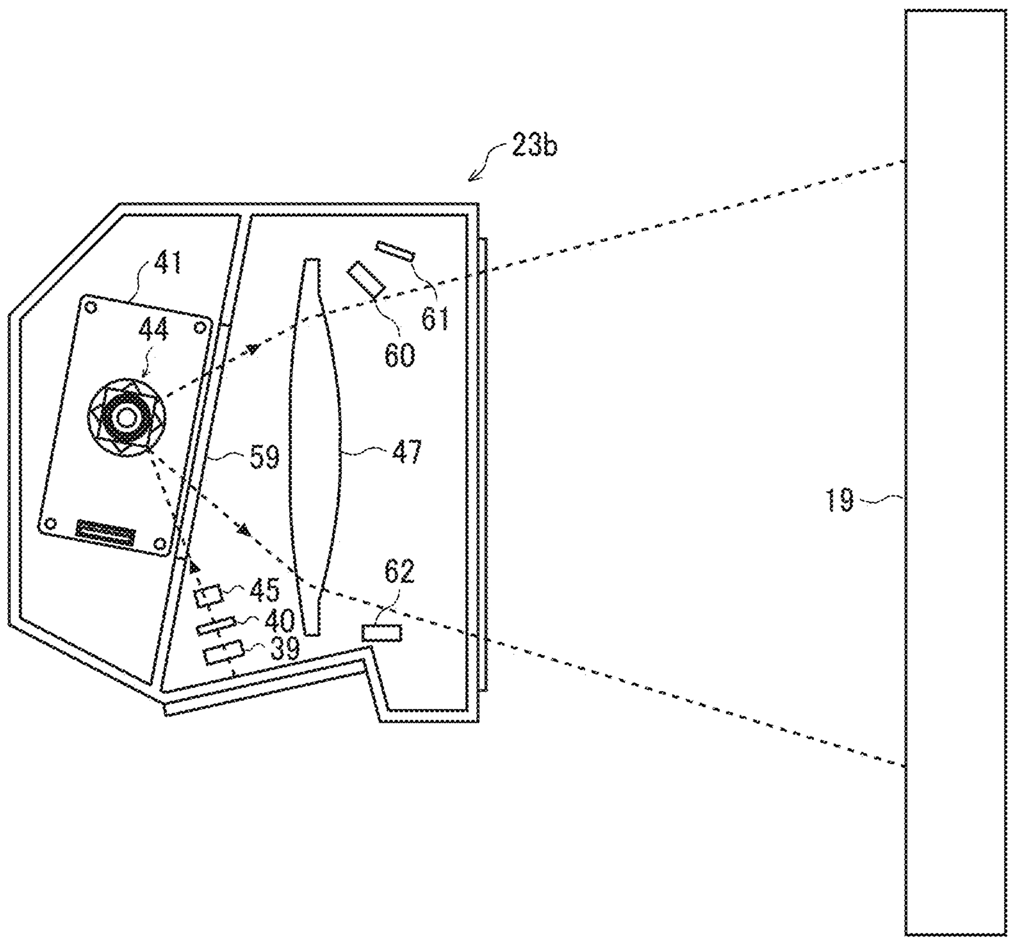
FIG. 16 is a schematic diagram illustrating the paths in which the laser beams are emitted from an exposure device to one of the multiple photoconductors, according to an embodiment of the present disclosure.

FIG. 16 is a schematic diagram illustrating the paths in which the laser beams are emitted from the exposure device 23 to one of the multiple photoconductors 19, according to the present embodiment.

As described above, the exposure device 23 according to the present embodiment includes, for example, the deflector 41 provided with the polygon mirror 44, the light source unit 36 provided with the collimator lens 39 and the aperture plate 40, a cylindrical lens 45, a first exit lens 47, and a dustproofing glass 49, and those components are stored in the housing 57. In FIG. 12, a soundproofing glass 59, a first synchronous lens 60, a synchronization mirror 61, and a second synchronous lens 62 are illustrated.

In the present embodiment, the material of the housing 57 is polycarbonate (PC) resin and acrylonitrile butadiene styrene (ABS) resin that are reinforced with glass fibers, which are expressed by [PC+ABS−(MS+GF) 40 FR (40)], and the thickness of the housing 57 is 1.8 mm. By contrast, the material of a typical resin component such as the cover component of the exposure device 23 is polystyrene (PS) resin expressed by [P−FR (17)], and the thickness of such a typical resin component 1.6 mm. Such a difference between those materials is present because it is desired that the housing 57 according to the present embodiment have high strength compared with typical components. The above-described exposure device 23 can be employed as the exposure device 6 according to the present embodiment as described as above with reference to FIG. 3 and FIG. 4

The structure or configuration for positioning the exposure device 6 to the housing 2 is described below with reference to FIG. 13.

Figure 13:
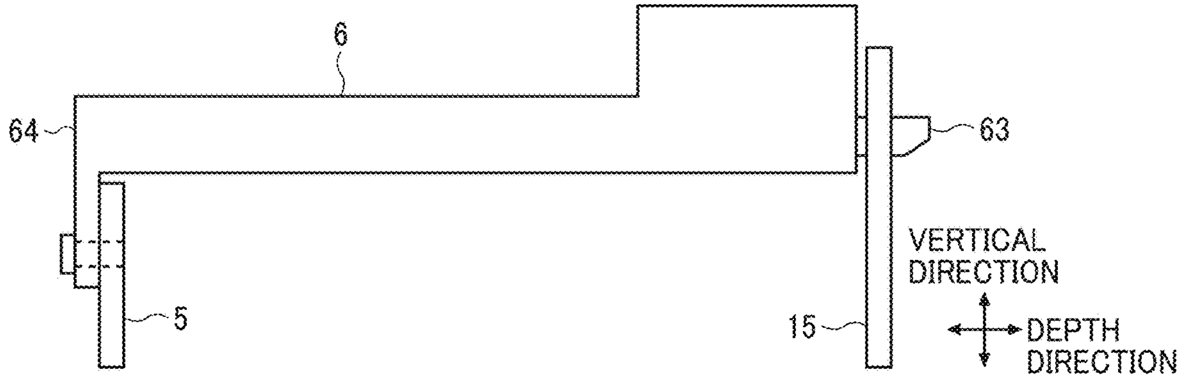
FIG. 13 is a schematic diagram illustrating the mechanisms for holding an exposure device when an exposure device is attached and positioned at a prescribed position of the housing of an image forming apparatus, according to an embodiment of the present disclosure.

FIG. 13 is a schematic diagram illustrating the mechanisms for holding the exposure device 6 when the exposure device 6 is attached and positioned at a prescribed position of the housing 2 of the image forming apparatus as illustrated in FIG. 4, according to the present embodiment.

As illustrated in FIG. 13, the exposure device 6 according to the present embodiment is positioned and held by a first housing bracket 5 and a second housing bracket 15 provided for the housing 2.

A pair of engagement pieces 63 that determine the relative positions of the exposure device 6 are arranged at two front ends in the depth direction of the exposure device 6 in the horizontal direction, and an engagement end 64 that determines the relative positions of the exposure device 6 is integrally arranged at a rear end in the depth direction. The pair of engagement pieces 63 according to the present embodiment are plate-like components whose bottom ends in the depth direction are notched, and are fixed to the front end of the exposure device 6 in the depth direction at a certain distance from each other. The engagement end 64 is a plate-like component formed so as to extend downward from the rear end in the depth direction of the exposure device 6, and the width of the engagement end 64 is equivalent to the length of the exposure device 6 in the width direction as illustrated in FIG. 13.

Figure 14:
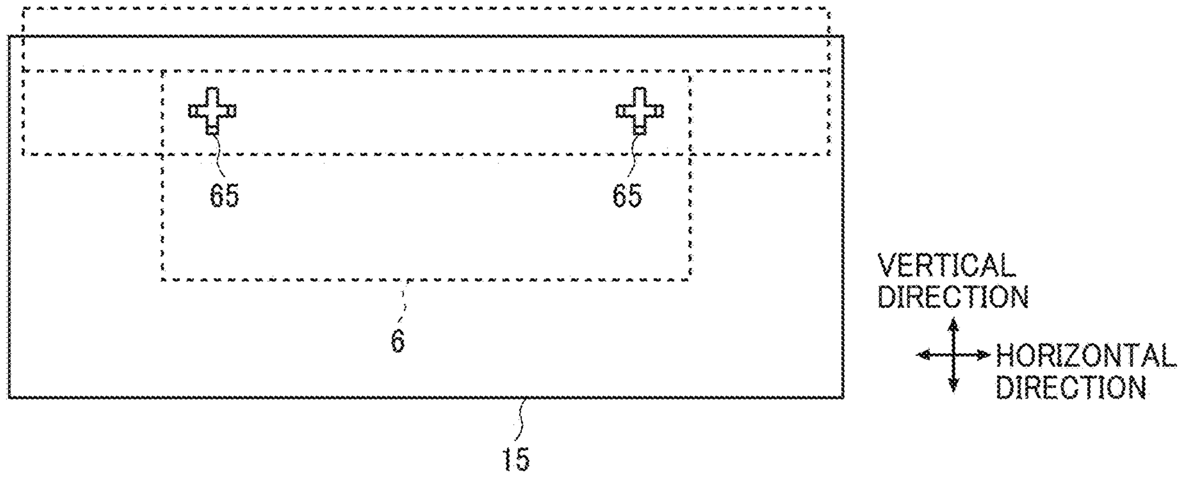
FIG. 14 is a schematic diagram illustrating a configuration of a second housing bracket used in embodiments of the present disclosure.

FIG. 14 is a schematic diagram illustrating a configuration of the second housing bracket 15 used in embodiments of the present disclosure.

Figure 15:
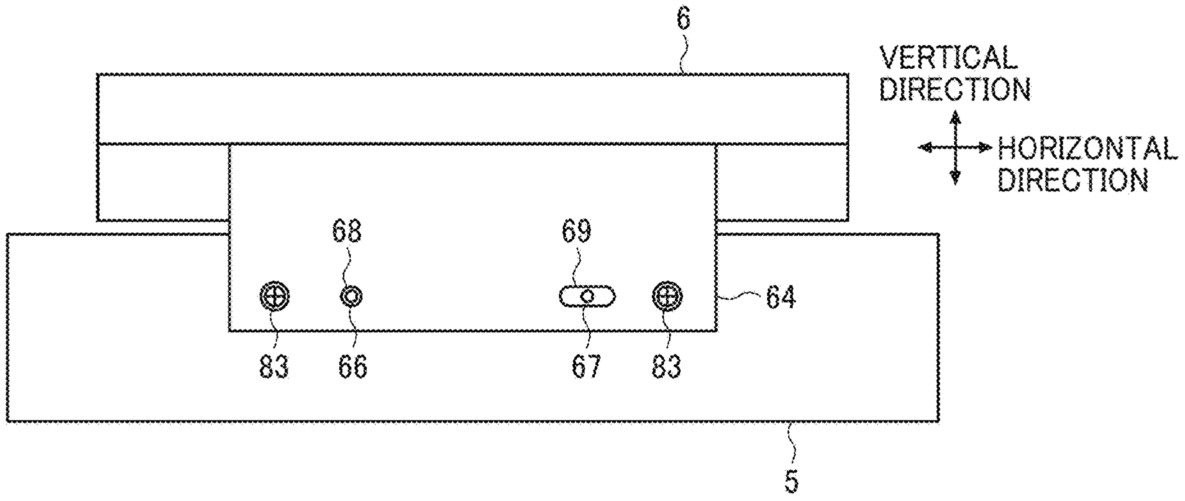
FIG. 15 is a schematic diagram illustrating the structure for positioning an exposure device by a first housing bracket and an engagement end, according to an embodiment of the present disclosure.

FIG. 15 is a schematic diagram illustrating the structure for positioning the exposure device 6 by the first housing bracket 5 and the engagement end 64, according to an embodiment of the present disclosure.

As illustrated in FIG. 14, the second housing bracket 15 is formed with two engaging holes 65 with which a pair of engagement pieces 63 can be engaged, respectively. The length of each one of the two engaging holes 65 in the horizontal direction is formed slightly larger than the length of each one of the pair of engagement pieces 63, and the length of each one of the two engaging holes 65 in the vertical direction is formed such that the engagement piece 63 can be fitted tightly. Due to such a configuration, the pair of engagement pieces 63 engage with the two engaging holes 65, and the position of the exposure device 6 on the housing 2 is determined in the vertical direction. As the exposure device 6 is pushed forward in the depth direction to a predetermined position in the housing 2, the engagement end 64 contacts the first housing bracket 5 across its entire surface. Due to such a configuration, the engagement end 64 contacts the first housing bracket 5 across its entire surface, and the position of the exposure device 6 on the housing 2 is determined in the depth direction.

As illustrated in FIG. 15, a pair of positioning pins 66 and 67 are arranged on the first housing bracket 5 at a certain distance from each other in the horizontal direction so as to face outward with reference to the exposure device 6, and a pair of positioning holes 68 and 69 into which the pair of positioning pins 66 and 67 can be fitted are arranged on the engagement end 64.

The positioning hole 68 is formed such that the positioning pin 66 can be fitted tightly, and the positioning hole 69 is an elongated hole such that the positioning pin 67 can move in the right and left directions. Due to such a configuration, the pair of positioning pins 66 and 67 are fitted into the pair of positioning holes 68 and 69, respectively, to determine the relative positions of the exposure device 6 in the vertical direction and horizontal direction in the housing 2.

After the pair of positioning pins 66 and 67 are fitted into the pair of positioning holes 68 and 69, respectively, the engagement end 64 is fixed to the first housing bracket 5 by a pair of screws 83. As a result, the exposure device 6 is successfully attached to the housing 2 at a prescribed position.

In the configuration or structure according to the present embodiment, the position of the exposure device 6 in the horizontal direction, the vertical direction, and the depth direction is restricted by the first housing bracket 5 and the engagement end 64, and the position in the vertical direction is restricted by the engagement piece 63 and the second housing bracket 15. Due to such a configuration, the space 16 as illustrated in FIG. 7 can be formed with reliability.

In the present embodiment as described above, the position in the vertical direction is restricted by the engagement piece 63 and the second housing bracket 15 despite the fact that the position in the horizontal direction, the vertical direction, and the depth direction is restricted by the first housing bracket 5 and the engagement end 64. This is because positional displacement may occur. As the exposure device 6 is to have a certain length in the depth direction depending on the layout of the optical-path length to the multiple photoconductors 19, the positional restriction by the first housing bracket 5 and the engagement end 64 on the near side in the depth direction may become insufficient to maintain the supporting strength due to the self weight of the exposure device 6. In order to handle such a situation, the position is restricted by the engagement piece 63 and the second housing bracket 15, which are positioned on the far side of the exposure device 6 in the depth direction. Due to such a configuration, the supporting stability of the exposure device 6 can be increased, and the positional displacement can be prevented.

Figure 17:
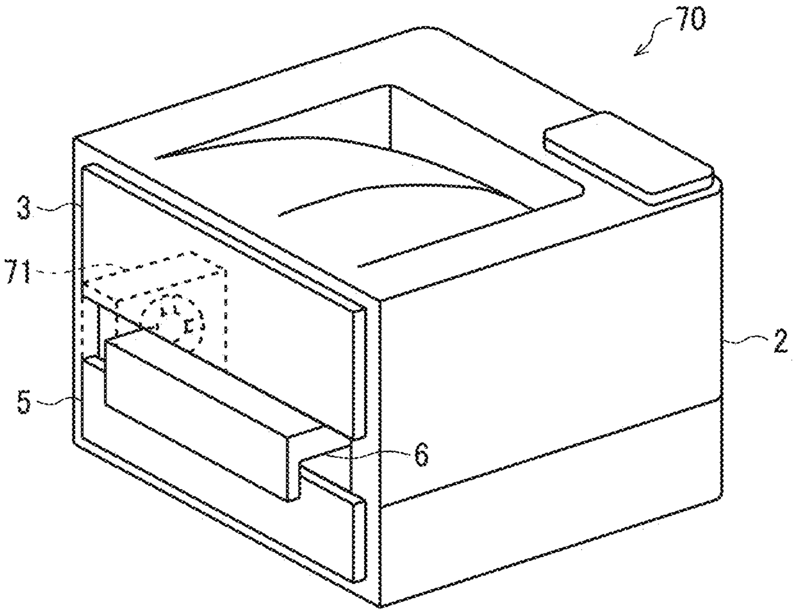
FIG. 17 is a schematic perspective view of an image forming apparatus according to the second embodiment of the present disclosure.
Figure 18:
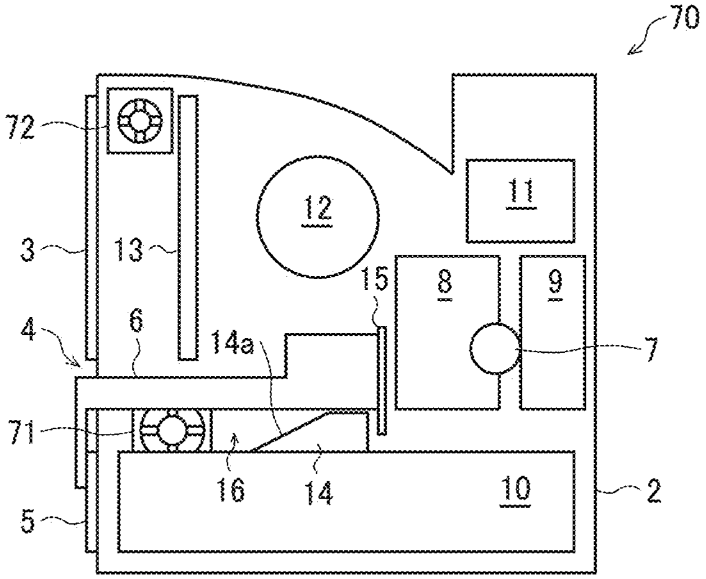
FIG. 18 is a schematic front view of an image forming apparatus according to the second embodiment of the present disclosure.

FIG. 17 and FIG. 18 are diagrams each illustrating a printer 70 that serves as an image forming apparatus according to the second embodiment of the present disclosure.

Figure 19:
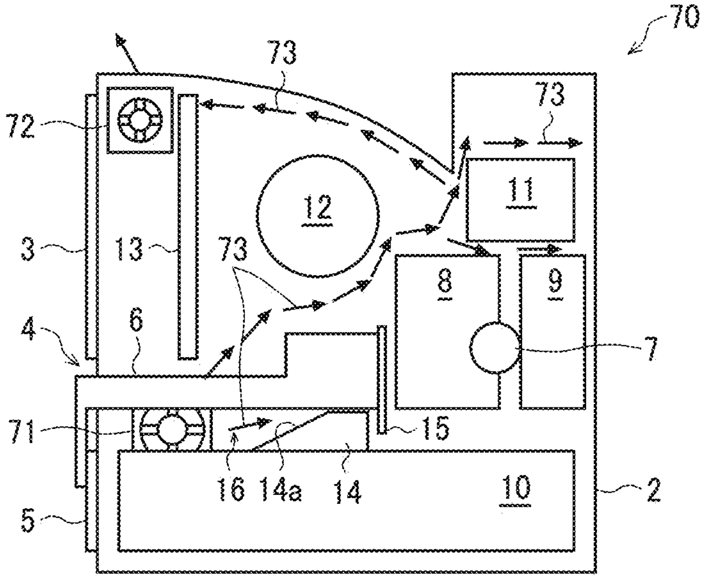
FIG. 19 is a schematic diagram of an image forming apparatus illustrating the airway of the airflow generated by a cooling fan, according to the second embodiment of the present disclosure.

The printer 70 according to the present embodiment is different from the printer 1 as described above in respect that the printer 70 has a cooling fan 71 and an exhaust fan 72, and the printer 70 according to the second embodiment of the present disclosure is equivalent to the printer 1 according to the first embodiment in the other respects. As illustrated in FIG. 19, each one of the cooling fan 71 and the exhaust fan 72 according to the present embodiment that generate cold airflow 73 is arranged inside the housing 2 of the image forming apparatus such that the airflow 73 generated by the cooling fan 71 passes through the space 16 and then is exhausted to the outside of the housing 2 of the image forming apparatus.

FIG. 19 is a schematic diagram of an image forming apparatus illustrating the airway of the airflow 73 generated by the cooling fan 71, according to the second embodiment of the present disclosure.

As illustrated in FIG. 19, the airflow 73 passes through the fixing device that is a typical heat source for the space 16 and the printer 70 according to the second embodiment of the present disclosure.

In the present embodiment, the polygon mirror 44 that is a major heat source of the exposure device 6 is fixed to the bottom side of the housing 57. Accordingly, the bottom side of the exposure device 6 generates a larger amount of heat than the other sides of the exposure device 6. In order to handle such a situation, the space 16 is arranged below the bottom side of the exposure device 6 and a path through which the airflow 73 passes is arranged in the space 16. Due to such a configuration, the cooling effectiveness of the exposure device 6 can be maximized.

Figure 20:
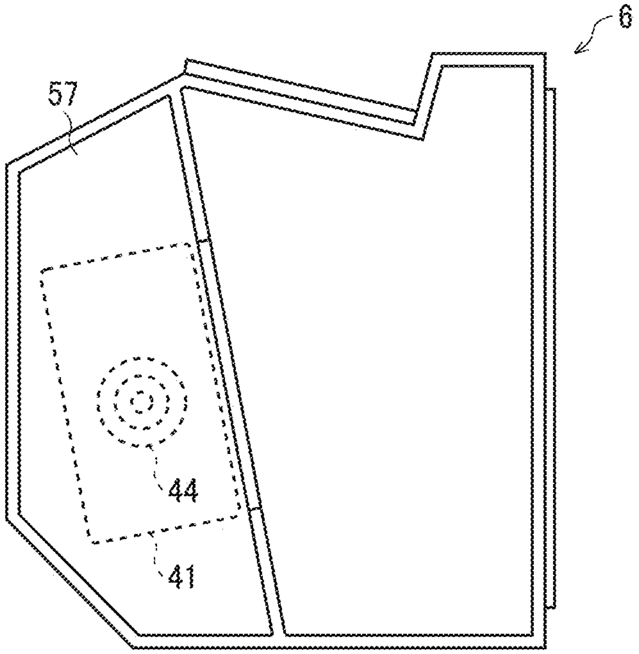
FIG. 20 is a schematic diagram illustrating the arrangement of a deflector in an exposure device according to the second embodiment of the present disclosure.

FIG. 20 is a schematic diagram illustrating the arrangement of the deflector 41 in the exposure device 6 according to the second embodiment of the present disclosure.

Figure 21:
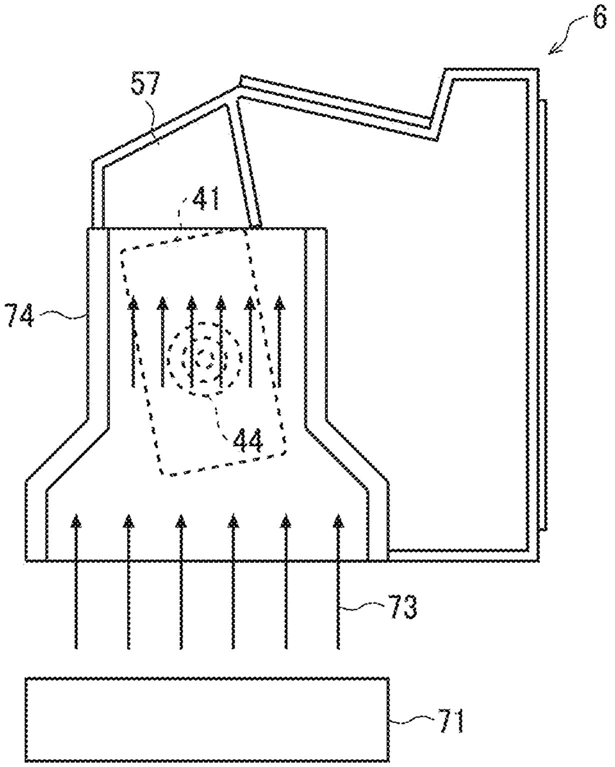
FIG. 21 is a schematic diagram illustrating the bottom face of an exposure device, according to the third embodiment of the present disclosure.

FIG. 21 is a schematic diagram illustrating the bottom face of the exposure device 6, according to the third embodiment of the present disclosure.

Figure 22:
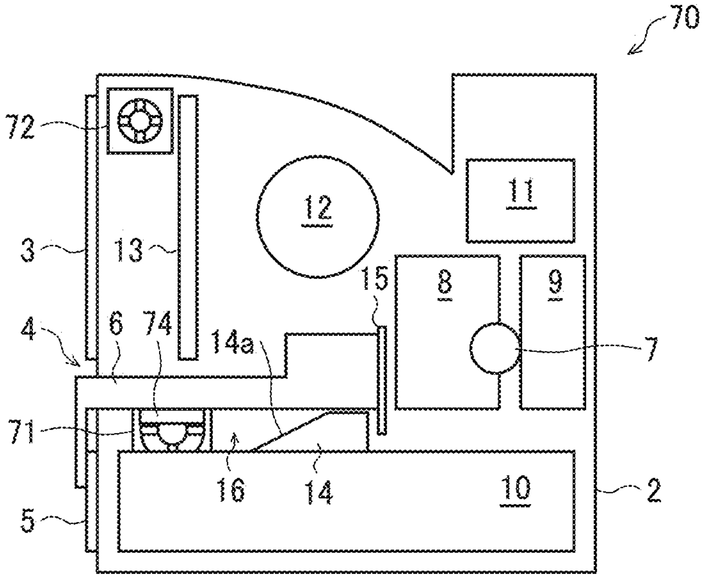
FIG. 22 is a schematic front view of an image forming apparatus according to the third embodiment of the present disclosure.

FIG. 22 is a schematic front view of an image firming apparatus according to the third embodiment of the present disclosure.

As illustrated in FIG. 20, in the second embodiment of the present disclosure, only a portion of the bottom side of the housing 57 is occupied by the polygon mirror 44. Accordingly, in the printer 70 according to the third embodiment of the present disclosure, as illustrated in FIG. 21 and FIG. 22, an airflow guide 74 that serves as a guide is arranged in the space 16 so as to correspond to the position at which the polygon mirror 44 is arranged, and the airflow 73 in the space 16 is concentrated toward the polygon mirror 44. As illustrated in FIG. 21, the airflow guide 74 according to the present embodiment gets narrower in width at a position corresponding to the position at which the polygon mirror 44 is arranged. Due to such a configuration, the cross-sectional area of the air course of the airflow 73 is reduced at a position corresponding to the polygon mirror 44, and the airflow 73 flows in a collective and concentrated manner. As a result, the cooling efficiencies further increase. It is desired that the airflow guide 74 be made of a material with high thermal conductivity such as a material containing one of gold (Au), silver (Ag), copper (Cu), and aluminum (Al).

In the present embodiment, the airflow guide 74 is arranged at a position corresponding to the polygon mirror 44. However, no limitation is indicated thereby, and similar advantageous effects can be achieved when as an airflow guide is arranged at a position corresponding to the first exit lens 47 or when an airflow guide is arranged at a position corresponding to the polygon mirror 44 and the first exit lens 47, which is a component having the standard in temperature in a similar manner to the polygon mirror 44.

Figure 23:
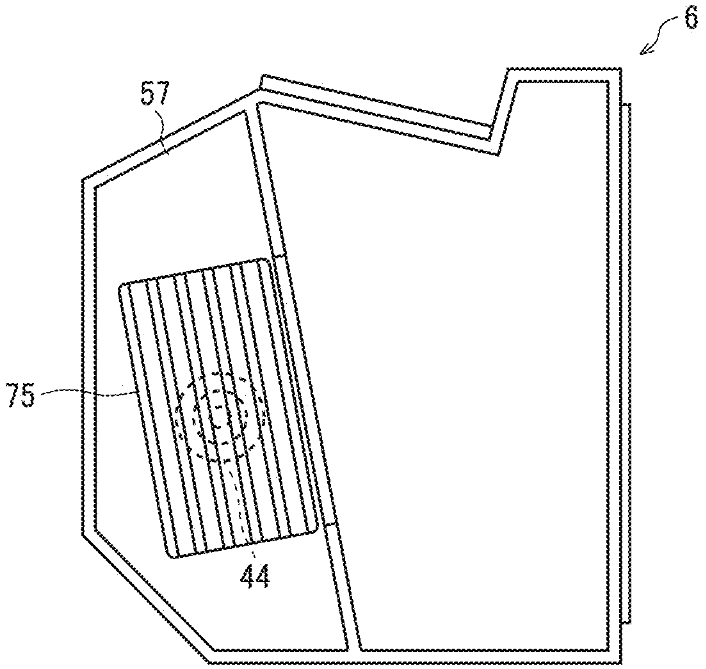
FIG. 23 is a schematic diagram illustrating the bottom face of an exposure device, according to the fourth embodiment of the present disclosure.

FIG. 23 is a schematic diagram illustrating the bottom face of the exposure device 6, according to the fourth embodiment of the present disclosure.

Figure 24:
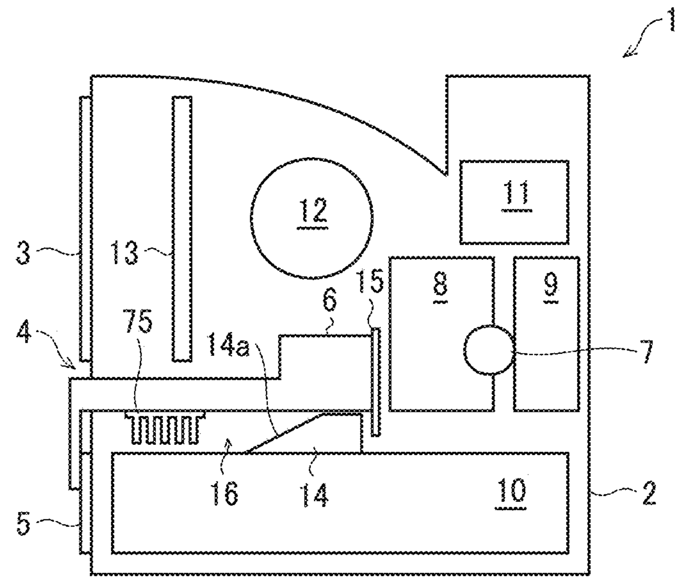
FIG. 24 is a schematic front view of an image forming apparatus according to the fourth embodiment of the present disclosure.

FIG. 24 is a schematic front view of an image firming apparatus according to the fourth embodiment of the present disclosure.

Figure 25:
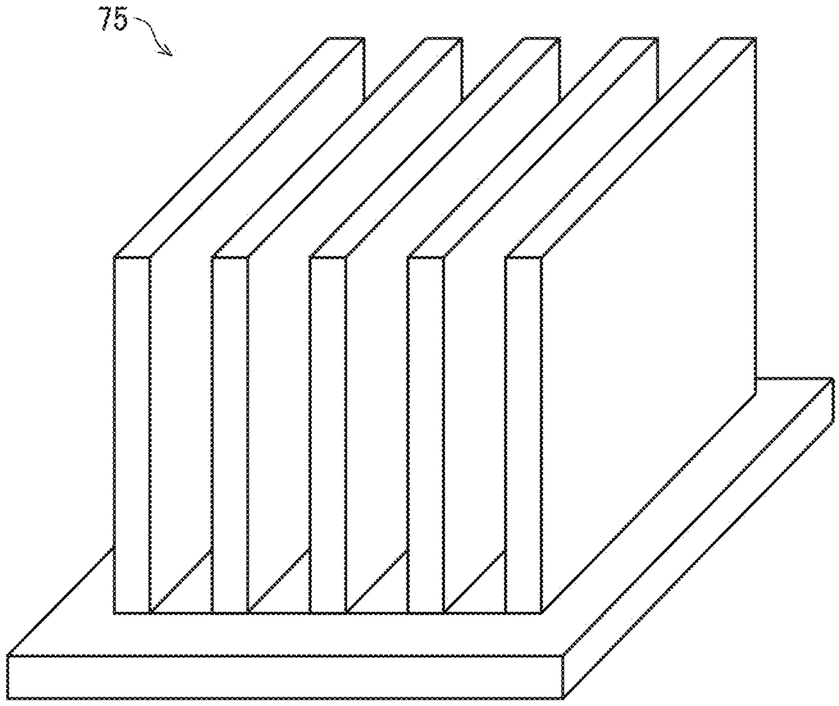
FIG. 25 is a diagram illustrating a heat sink used in the fourth embodiment of the present disclosure.

FIG. 25 is a diagram illustrating a heat sink 75 used in the fourth embodiment of the present disclosure.

As illustrated in FIG. 23 and FIG. 24, in the printer 1 according to the fourth embodiment of the present disclosure, the heat sink 75 that serves as an endothermic part as illustrated in FIG. 25 is arranged at a position in the space 16 corresponding to the position at which the polygon mirror 44 is arranged. The heat sink 75 conducts the heat of an object to metal and radiates the heat by facilitating the convection of air by heat. By so doing, the object is cooled. In the present embodiment, the cooling efficiencies of the exposure device 6 can be increased by arranging the heat sink 75 in the space 16 given below the polygon mirror 44. The heat sink 75 according to the present embodiment exerts a cooling effect just by being arranged in the space 16, but the cooling efficiencies can further be increased by arranging the cooling fan 71 and the exhaust fan 72 as described above together with the heat sink 75.

In the present embodiment, the heat sink 75 is arranged at a position corresponding to the polygon mirror 44. However, no limitation is indicated thereby, and similar advantageous effects can be achieved when a heat sink is arranged at a position corresponding to the first exit lens 47 or when a heat sink is arranged at a position corresponding to the polygon mirror 44 and the first exit lens 47.

Figure 26:
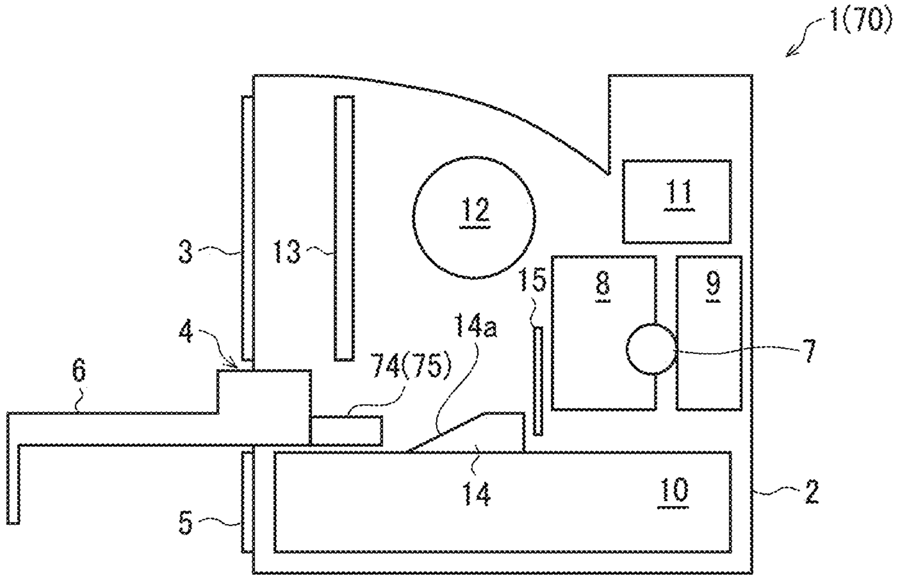
FIG. 26 is a schematic front view of an image forming apparatus and illustrates a technical problem caused when an exposure device is attached to or detached from a housing, according to an embodiment of the present disclosure.

FIG. 26 is a schematic front view of the image forming apparatus and illustrates a technical problem caused when the exposure device 6 is attached to or detached from the housing 2, according to the present embodiment.

Figure 27:
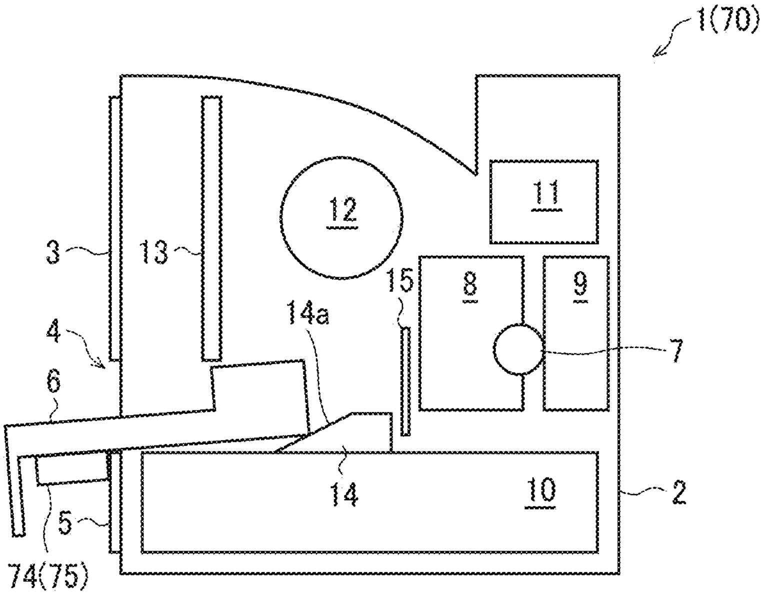
FIG. 27 is a schematic front view of an image forming apparatus and illustrates a technical problem caused when an exposure device is attached to or detached from a housing, according to an embodiment of the present disclosure.

FIG. 27 is a schematic front view of the image forming apparatus and illustrates a technical problem caused when the exposure device 6 is attached to or detached from the housing 2, according to the present embodiment.

In the printer 1 and the printer 70 as described above, the exposure device 6 needs to be attachable to and detachable from the housing 2 in order to handle a case in which some sort of troubles or errors occur in the exposure device 6 and the exposure device 6 is to be replaced not only at the time of assembly before shipment but also at the customer's place after shipment.

When the printer 1 or the printer 70 has the airflow guide 74 or the heat sink 75 as described above when the exposure device 6 is attached to or detached from the housing 2, there are three possible problems as follows.

The first problem is that the size of the insertion slot 4 is to be made small in order to downsize the image forming apparatus upon assembling the exposure device 6. Under these conditions, it is difficult to arrange the airflow guide 74 or the heat sink 75 inside the housing 2 to detach the exposure device 6.

The second problem is that, if the exposure device 6 is attached to or detached from the housing 2 upon attaching the airflow guide 74 or the heat sink 75 to the inside of the housing 2, the exposure device 6 interferes with the airflow guide 74 or the heat sink 75 as illustrated in FIG. 26 when the exposure device 6 is attached or detached, and the exposure device 6 cannot be attached or detached.

The third problem is that, if the exposure device 6 is attached to or detached from the housing 2 upon attaching the airflow guide 74 or the heat sink 75 to the exposure device 6, the internal layout of the housing 2 is restricted as the size of the insertion slot 4 is small and a path that includes the airflow guide 74 or the heat sink 75 for attachment and detachment has to be left as illustrated in FIG. 27.

A fifth embodiment of the present disclosure with which the above three problems can be solved is described below.

Figure 28:
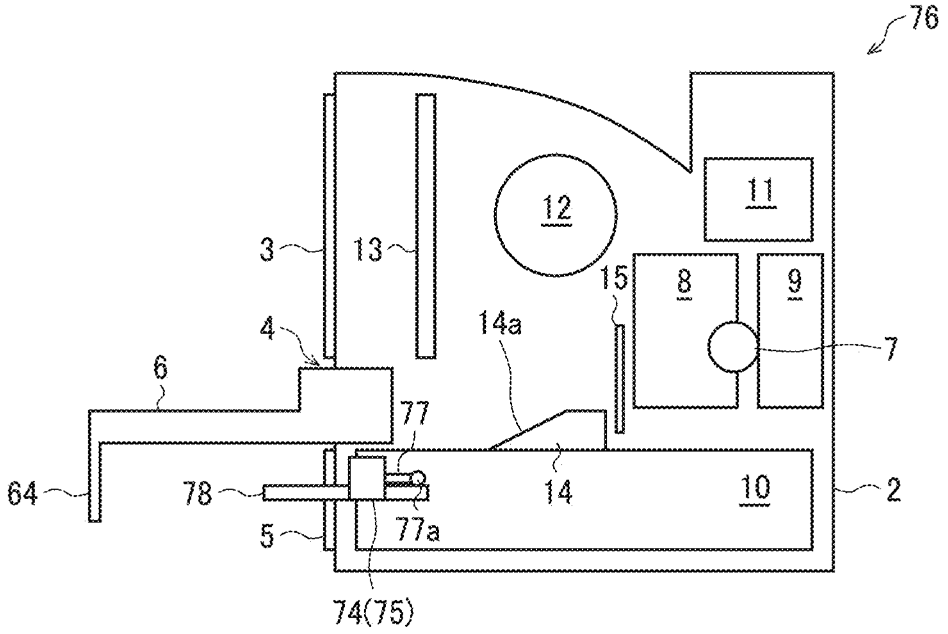
FIG. 28 is a schematic front view of an image forming apparatus to which an exposure device is not yet attached, according to the fifth embodiment of the present disclosure.

FIG. 28 is a schematic front view of a printer 76 that serves as an image forming apparatus to which the exposure device 6 is not yet attached, according to the fifth embodiment of the present disclosure.

Compared with the printer 1 as described above, the airflow guide 74 or the heat sink 75 is arranged inside the housing 2 in the printer 76 according to the fifth embodiment of the present disclosure, and the airflow guide 74 or the heat sink 75 can slide. The printer 76 according to the fifth embodiment of the present disclosure is different from the printer 1 only in this respect, and the printer 76 according to the fifth embodiment of the present disclosure is equivalent to the printer 1 in the other respects. In the following description, the airflow guide 74 is referred to, but the airflow guide 74 may be replaced with the heat sink 75.

Figure 29:
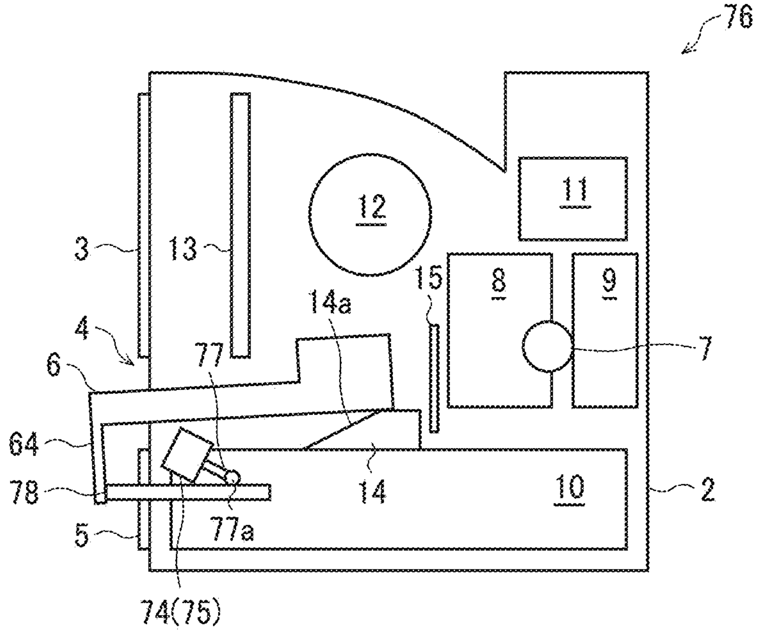
FIG. 29 is a schematic front view of an image forming apparatus to which an exposure device is being attached, according to the fifth embodiment of the present disclosure.

FIG. 29 is a schematic front view of an image forming apparatus to which the exposure device 6 is being attached, according to the fifth embodiment of the present disclosure.

Figure 30:
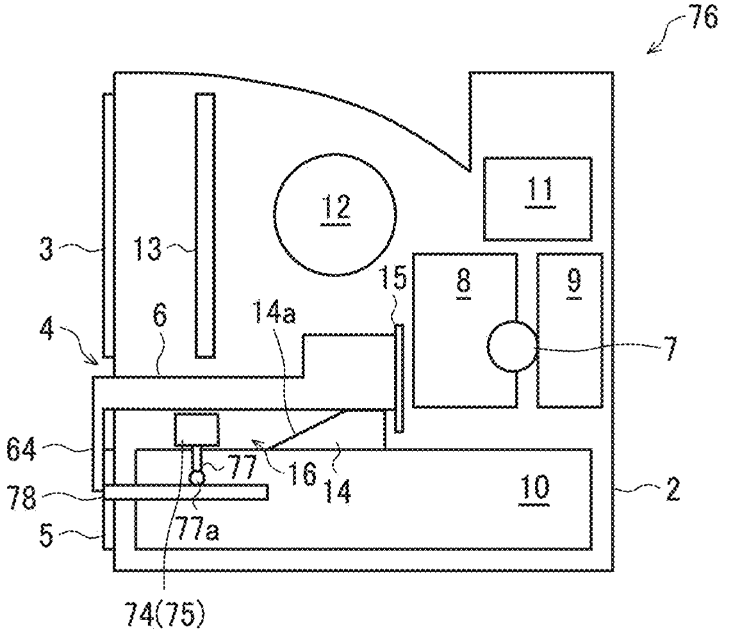
FIG. 30 is a schematic front view of an image forming apparatus to which an exposure device has been attached, according to the fifth embodiment of the present disclosure.

FIG. 30 is a schematic front view of an image forming apparatus to which the exposure device 6 has been attached, according to the fifth embodiment of the present disclosure.

As illustrated in FIG. 28, the holding arm 77 is provided with a pinion gear 77*a* at one end, and the airflow guide 74 is attached to the other end of the holding arm 77. The pinion gear 77*a* according to the present embodiment meshes with a rack gear provided for a moving arm 78 that is supported by the housing 2 in a movable manner in the horizontal direction. One end of the moving arm 78 located outside the apparatus can contact the engagement end 64 of the exposure device 6 when the exposure device 6 is mounted inside the housing 2, and the moving arm 78 moves to the right as illustrated in FIG. 28 as the exposure device 6 is inserted into the housing 2. Then, once the moving arm 78 has moved, the pinion gear 77*a* that meshes with the rack provided for the moving arm 78 rotates, and the airflow guide 74 gradually rises as illustrated in FIG. 29 from the collapsed position where it does not interfere with the attachment of the exposure device 6 to the housing 2 as illustrated in FIG. 28. Subsequently, when the exposure device 6 reaches the prescribed position, the airflow guide 74 is positioned at a prescribed position in the space 16 as illustrated in FIG. 30.

Figure 31:
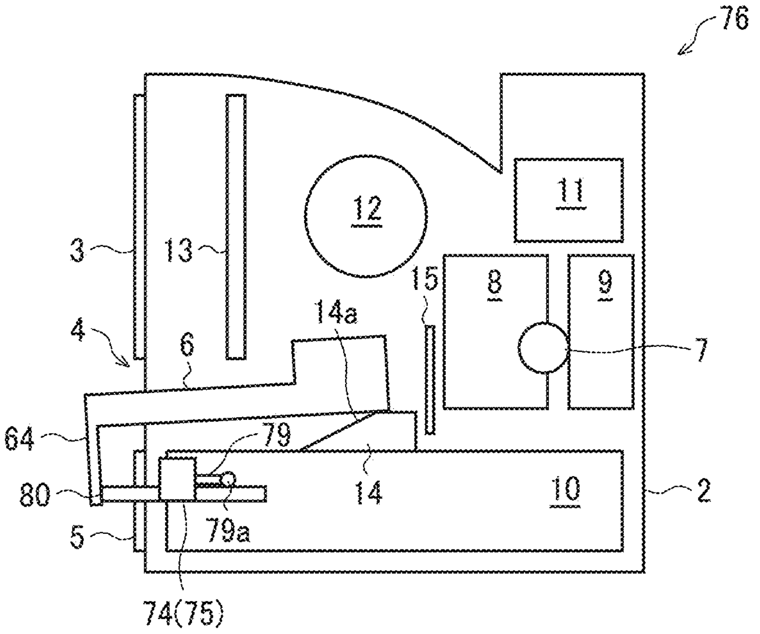
FIG. 31 is a schematic front view of an image forming apparatus to which an exposure device is not yet attached, according to a modification of the fifth embodiment described above.

FIG. 31 is a schematic front view of an image forming apparatus to which the exposure device 6 is not yet attached, according to a modification of the fifth embodiment described above.

Figure 32:
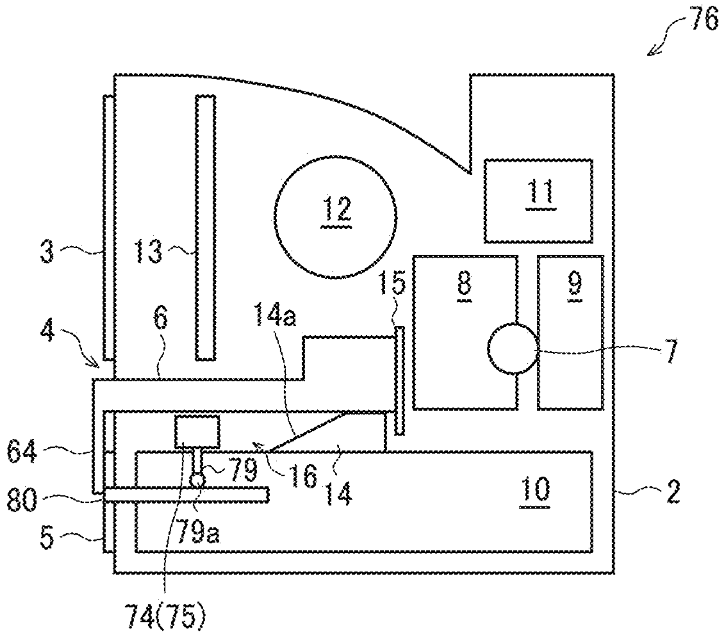
FIG. 32 is a schematic front view of an image forming apparatus to which an exposure device has been attached, according to a modification of the fifth embodiment described above.

FIG. 32 is a schematic front view of an image forming apparatus to which the exposure device 6 has been attached, according to a modification of the fifth embodiment described above.

The airflow guide 74 is referred to in the present modification of the above embodiments of the present disclosure, but the airflow guide 74 may be replaced with the heat sink 75.

A holding arm 79 has a helical torsion spring 79*a* that is an elastic member at one end, and the airflow guide 74 according to the present embodiment is attached to the other end of the holding arm 79. The helical torsion spring 79*a* according to the present embodiment has an elastic force that rotates the airflow guide 74 in a clockwise direction in FIG. 31, but a state is kept in which such an elastic force is prevented from acting by a stopper. A moving arm 80 is arranged near the holding arm 79, and one end of the moving arm 80 located outside the apparatus can contact the engagement end 64 of the exposure device 6 when the exposure device 6 is mounted inside the housing 2. Moreover, the moving arm 80 can move to the right as illustrated in FIG. 31 as the exposure device 6 is inserted into the housing 2. Once the moving arm 80 has moved, the moving arm 80 releases the stopper. As the elastic force of the helical torsion spring 79*a* starts acting, the airflow guide 74 according to the present embodiment is positioned at a prescribed position in the space 16 as illustrated in FIG. 32 from the collapsed position where it does not interfere with the attachment of the exposure device 6 to the housing 2 as illustrated in FIG. 31.

In the fifth embodiment of the present disclosure, as the exposure device 6 is attached to the housing 2, the airflow guide 74 gradually rises from the collapsed position and then is positioned at a prescribed position. In other words, as the exposure device 6 is inserted into the housing 2, the airflow guide 74 is linearly positioned at a prescribed position in the space 16.

Due to such a configuration, the shock or vibration that occurs when the airflow guide 74 is positioned at the prescribed position can be prevented.

In the present modification of the fifth embodiment of the present disclosure, as the exposure device 6 is attached to the housing 2, the airflow guide 74 is instantaneously positioned at a prescribed position from the collapsed position. As a result, the load on the housing 2 when the exposure device 6 is mounted can be reduced, and the degree of operability can be increased.

In the embodiments of the present disclosure, when the exposure device 6 is arranged inside the housing 2, the exposure device 6 is moved into the housing 2 while the front end of the exposure device 6 in the insertion direction is contacting the inclined plane 14*a* formed on the positioning member 14 as illustrated in FIG. 6. In the present embodiment, when exposure device 6 according to the present embodiment is attached to the housing 57, as described above, the relative positions of optical components such as lenses are determined with a high degree of precision. Due to such configurations as described above, it is desired that the impact when the exposure device 6 contacts the positioning member 14 be small in order to prevent the position of the optical components from being displaced due to the impact or shock caused when the exposure device 6 contacts the positioning member 14.

In order to achieve such functions, as the sixth embodiment of the present disclosure, the inclined plane 14*a* provided with a cushioning member 81 is described below with reference to FIG. 33.

Figure 33:
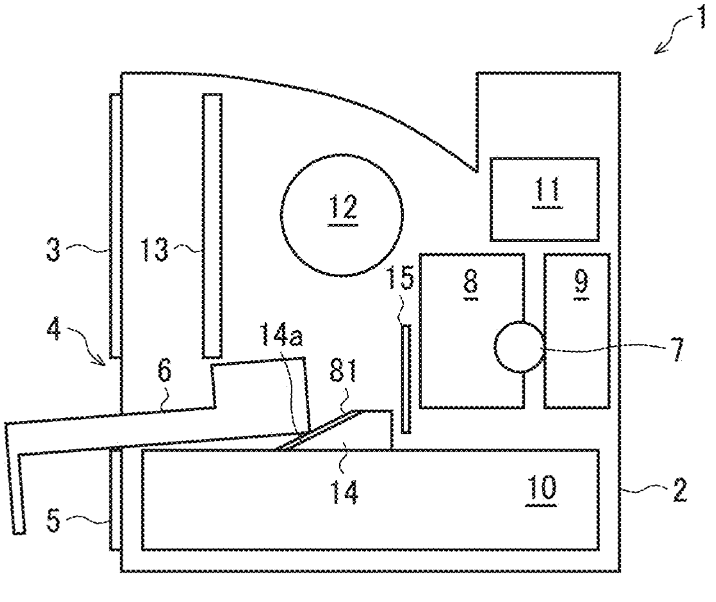
FIG. 33 is a schematic front view of an image forming apparatus according to the sixth embodiment of the present disclosure.

FIG. 33 is a schematic front view of an image forming apparatus according to the sixth embodiment of the present disclosure.

Due to such a configuration, when the exposure device 6 is attached to the housing 2, the impact or shock caused when the exposure device 6 contacts the positioning member 14 is absorbed by the cushioning member 81. Accordingly, the exposure device 6 can be prevented from being shocked when the exposure device 6 is attached to the housing 2. The cushioning member 81 according to the present embodiment may be, for example, a sponge.

Figure 34:
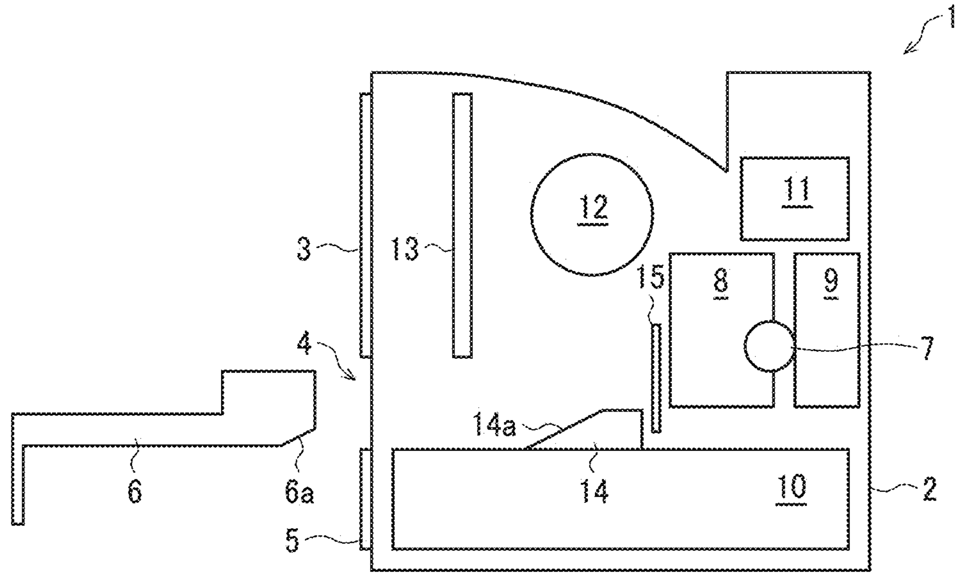
FIG. 34 is a schematic front view of an image forming apparatus to which an exposure device is not yet attached, according to the seventh embodiment of the present disclosure.

FIG. 34 is a schematic front view of an image forming apparatus to which an exposure device is not yet attached, according to the seventh embodiment of the present disclosure.

Figure 35:
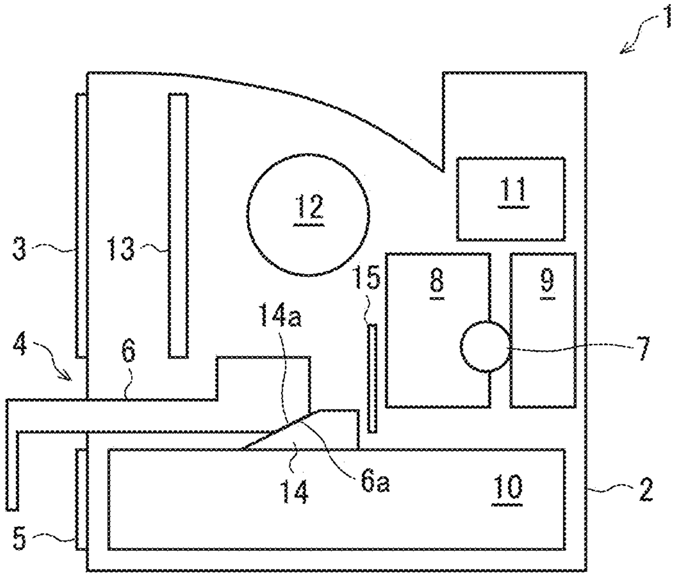
FIG. 35 is a schematic front view of an image forming apparatus to which an exposure device has been attached, according to the seventh embodiment of the present disclosure.

FIG. 35 is a schematic front view of an image firming apparatus to which an exposure device has been attached, according to the seventh embodiment of the present disclosure.

The seventh embodiment of the present disclosure is different from the first embodiment of the present disclosure as described above in respect that a contact surface 6*a* whose angle is parallel to that of the inclined plane 14*a* is arranged at the bottom end of the exposure device 6 in the insertion direction into the housing 2, where the contact surface 6*a* is formed so as to contact the inclined plane 14*a* across its entire surface, and the printer 1 according to the seventh embodiment of the present disclosure is equivalent to the printer 1 according to the first embodiment of the present disclosure as described above in the other respects.

Due to such a configuration, the positioning member 14 contacts the exposure device 6 across its surface when the exposure device 6 is attached to the housing 2, and the occurrence of shock can be prevented. After the contact with the positioning member 14, the exposure device 6 can be moved in the horizontal direction while maintaining its posture. Due to such a configuration, the degree of operability can be increased.

Figure 36:
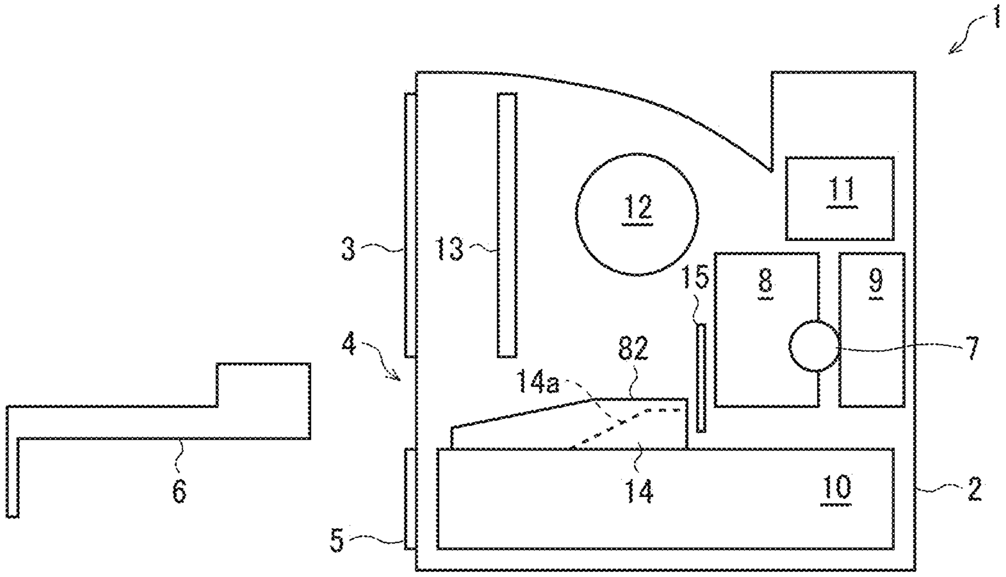
FIG. 36 is a schematic front view of an image forming apparatus to which an exposure device is not yet attached, according to the eighth embodiment of the present disclosure.

FIG. 36 is a schematic front view of an image forming apparatus to which the exposure device 6 is not yet attached, according to the eighth embodiment of the present disclosure.

Figure 37:
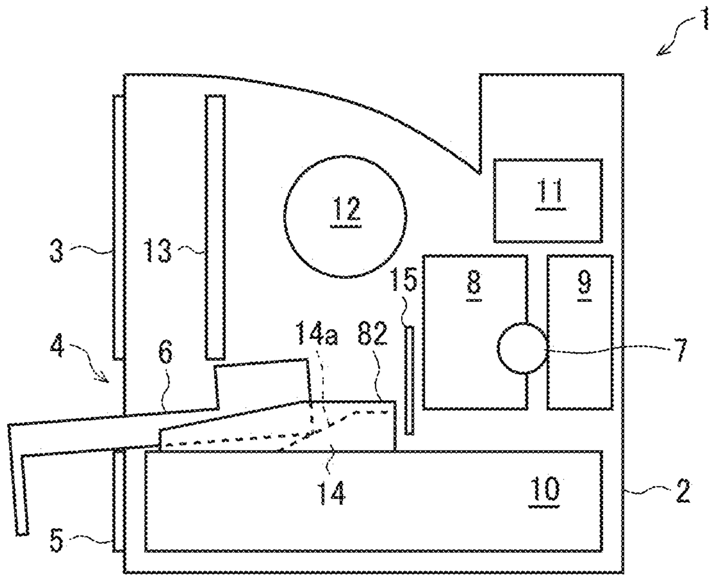
FIG. 37 is a schematic front view of an image forming apparatus to which an exposure device has been attached, according to the eighth embodiment of the present disclosure.

FIG. 37 is a schematic front view of an image forming apparatus to which the exposure device 6 has been attached, according to the eighth embodiment of the present disclosure.

The eighth embodiment of the present disclosure is different from the first embodiment of the present disclosure as described above in respect that a pair of guide units 82 that serve as guides and guide both side faces of the moving exposure device 6 are arranged in a path through which the exposure device 6 is moved and attached to the housing 2, and the printer 1 according to the eighth embodiment of the present disclosure is equivalent to the printer 1 according to the first embodiment of the present disclosure as described above in the other respects.

Due to such a configuration, both side faces of the moving exposure device 6 are guided by the pair of guide units 82 when the exposure device 6 is attached to the housing 2, and the exposure device 6 can be prevented from contacting other members before the exposure device 6 reaches the prescribed position. As the movement of the exposure device 6 is guided by the multiple guide units 82, the exposure device 6 can easily be positioned at the prescribed position with reliability and the degree of operability can be increased.

In the above embodiments of the present disclosure, each one of the printers 17, and 76 is described as an image forming apparatus. However, an image forming apparatus to which the embodiments of the present disclosure can be applied is not limited to a printer, and the embodiments of the present disclosure may be applied to, for example, a photocopier, a facsimile (FAX) machine, and a multifunction peripheral (MFP). In the above embodiments of the present disclosure, the sheet S that serves as a recording medium on which an image is formed is used. However, the sheet S is not limited to a recording sheet, and may be, for example, a thick sheet, a postcard, a roll sheet, an envelope, an overhead projector (OHP) film, a resin film, plain paper, thin paper, tracing paper, and coated paper such as art paper. The sheet S according to the present embodiment may be any sheet-like material or substance as long as an image can be formed thereon.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. An image forming apparatus, comprising:

a housing including a side face and an insertion slot on the side face;

an exposure device attached to and detachable from the housing via the insertion slot;

a positioning member disposed inside the housing, the positioning member having an inclined surface that guides a front end of the exposure device to a position above a lower portion of the insertion slot as the exposure device is inserted through the insertion slot; and a space inside the housing and under the exposure device, as viewed along an insertion direction in which the exposure device is inserted through the insertion slot, after the exposure device is inserted into the housing and positioned at the position, wherein as viewed along the insertion direction, the front end of the exposure device protrudes upward, and after the exposure device is inserted through the insertion slot, a top end of the front end of the exposure device is higher than a top end of the insertion slot.

2. The image forming apparatus according to claim 1, further comprising:

a cooling fan configured to generate airflow to cool the exposure device, wherein the space is a path through which the airflow generated by the cooling fan passes.

3. The image forming apparatus according to claim 2, further comprising:

a guide disposed in the path, wherein the exposure device includes a polygon mirror or an optical lens, and the exposure device has a width that decreases at a position corresponding to an installation position of at least one of the polygon mirror or the optical lens.

4. The image forming apparatus according to claim 3, wherein the guide is positioned in the path when the exposure device is attached to at the position, and the guide is not positioned inside the path when the exposure device is not attached at the position.

5. The image forming apparatus according to claim 4, wherein the guide is linearly disposed in the path as the exposure device is inserted into the insertion slot.

6. The image forming apparatus according to claim 4, wherein the guide is disposed in the path due to an elastic force as the exposure device is inserted into the insertion slot.

7. The image forming apparatus according to claim 1, further comprising:

a heat sink in the space.

8. The image forming apparatus according to claim 7, wherein the exposure device includes a polygon mirror or an optical lens, and the heat sink is disposed at a position adjacent to an installation position of the polygon mirror or the optical lens.

9. The image forming apparatus according to claim 7, wherein the heat sink is positioned in the space when the exposure device is attached at the position, and the heat sink is not positioned in the space when the exposure device is not attached at the position.

10. The image forming apparatus according to claim 9, wherein the heat sink is linearly disposed in the space as the exposure device is inserted into the insertion slot.

11. The image forming apparatus according to claim 9, wherein the heat sink is disposed in the space due to an elastic force as the exposure device is inserted into the insertion slot.

12. The image forming apparatus according to claim 1, wherein the exposure device has a portion that contacts the inclined surface, and the portion that contacts the inclined surface has an angle parallel to that of the inclined plane.

13. The image forming apparatus according to claim 1, further comprising:

a cushioning member that contacts the exposure device in a path in which the exposure device moves from the insertion slot to the prescribed position.

14. The image forming apparatus according to claim 13, wherein the cushioning member is disposed on the inclined surface.

15. The image forming apparatus according to claim 1, further comprising:

a guide configured to guide the exposure device in a path where the exposure device moves from the insertion slot to the prescribed position.

16. The image forming apparatus according to claim 13, wherein the cushioning member is a sponge.

17. An image forming apparatus, comprising:

a housing including a side face and an insertion slot on the side face;

an exposure device attached to and detachable from the housing via the insertion slot;

an inclined surface disposed inside the housing, the inclined surface guiding a front end of the exposure device to a position above a lower portion of the insertion slot as the exposure device is inserted through the insertion slot; and a space inside the housing and under the exposure device, as viewed along an insertion direction in which the exposure device is inserted through the insertion slot, after the exposure device is inserted into the housing and positioned at the position, wherein as viewed along the insertion direction, the front end of the exposure device protrudes upward, and after the exposure device is inserted through the insertion slot, a top end of the front end of the exposure device is higher than a top end of the insertion slot.

* * * * *